United States Patent
Fukushima et al.

(10) Patent No.: US 6,839,166 B2
(45) Date of Patent: Jan. 4, 2005

(54) VERSATILE MICROSCOPE SYSTEM WITH MODULATING OPTICAL SYSTEM

(75) Inventors: Ikutoshi Fukushima, Fuchu (JP); Takeshi Hashimoto, Hidaka (JP); Mitsuru Namiki, Hanno (JP); Hiroyuki Minakata, Hachioji (JP); Kimiaki Yamamoto, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 169 days.

(21) Appl. No.: 10/213,497

(22) Filed: Aug. 7, 2002

(65) Prior Publication Data

US 2003/0030902 A1 Feb. 13, 2003

(30) Foreign Application Priority Data

Aug. 9, 2001 (JP) ........................................ 2001-242635
Jul. 1, 2002 (JP) ........................................ 2002-192665

(51) Int. Cl.$^7$ .............................................. G02B 21/00
(52) U.S. Cl. ...................................... 359/368; 359/247
(58) Field of Search ................................ 359/237, 238, 359/240, 245, 247, 274, 278, 368, 370, 371

(56) References Cited

U.S. PATENT DOCUMENTS 4,561,731 A   12/1985   Kley
6,424,449 B1 * 7/2002   Namiki ........................ 359/247

FOREIGN PATENT DOCUMENTS

| JP | 56-137324 A | 10/1981 |
| JP | 58-184115 A | 10/1983 |
| JP | 9-80313 A | 3/1997 |

* cited by examiner

*Primary Examiner*—Drew A. Dunn
*Assistant Examiner*—Joshua L Pritchett
(74) *Attorney, Agent, or Firm*—Frishauf, Holtz, Goodman & Chick, P.C.

(57) ABSTRACT

An illuminating light modulating device modulates at least one of wavelength, phase, intensity, polarization, and coherency of the light emitted to an object by an illuminating device. A pupil modulating device is disposed near a pupil plane of an objective lens, and modulates at least one of phase, intensity and direction of polarization of the luminous flux including the information of the object. An image pickup device is disposed on a plane on which the image of the object is formed by the objective lens and an imaging lens, and picks up the image of the object. An image analysis device analyzes the image of the object picked up by the image pickup device. A parameter decision device adjusts the modulation amounts of the illuminating light modulating device and the pupil modulating device by using the image information of the object analyzed by the image analysis device.

22 Claims, 21 Drawing Sheets

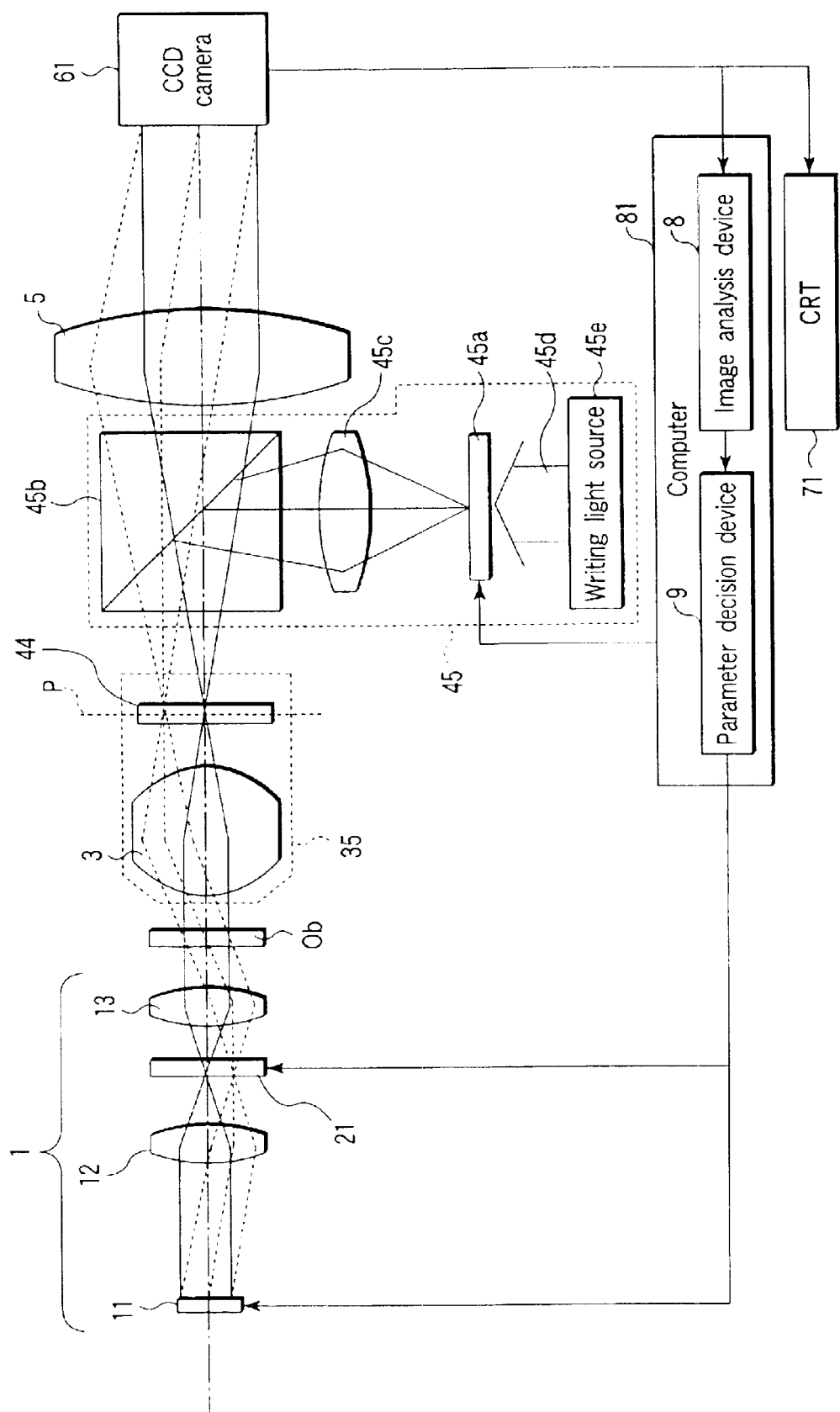
F I G. 8

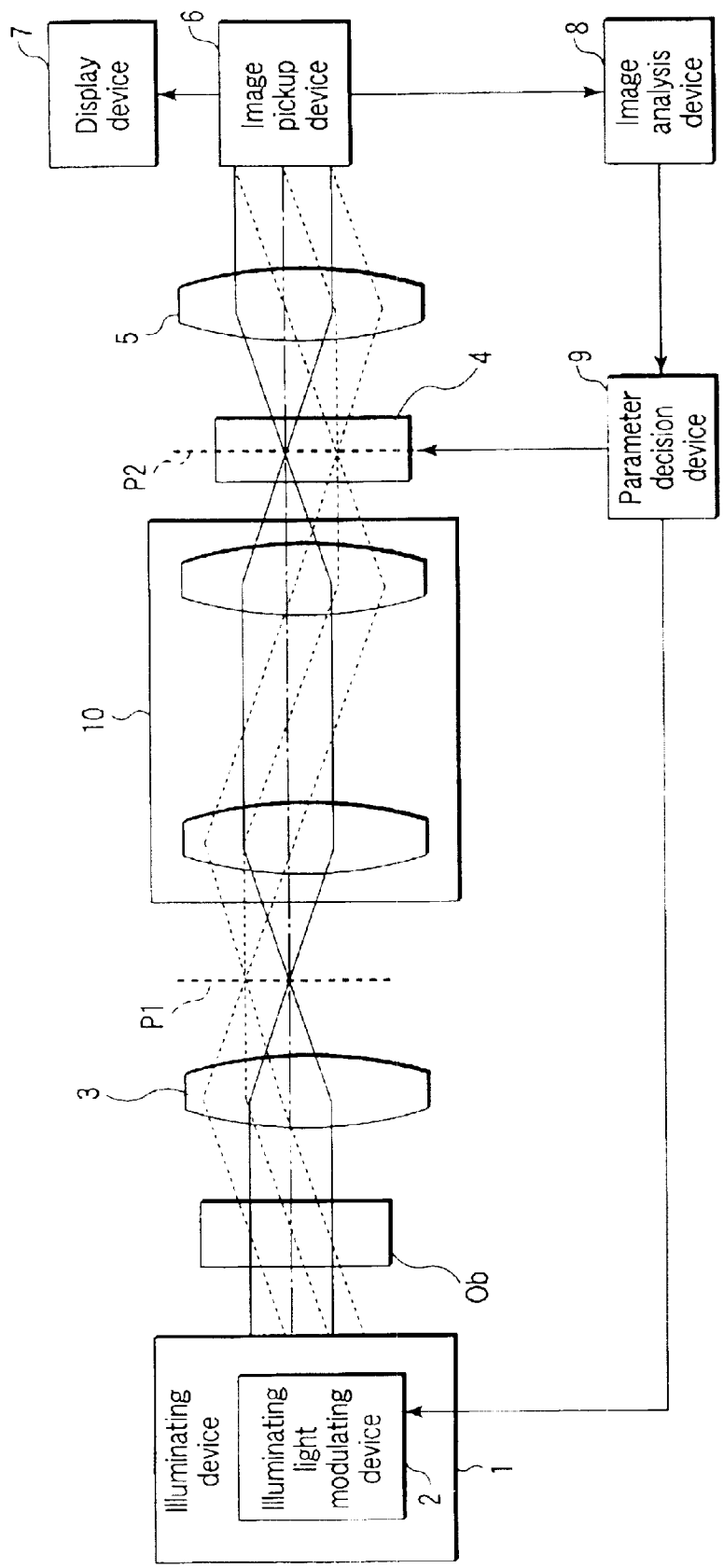
F I G. 13

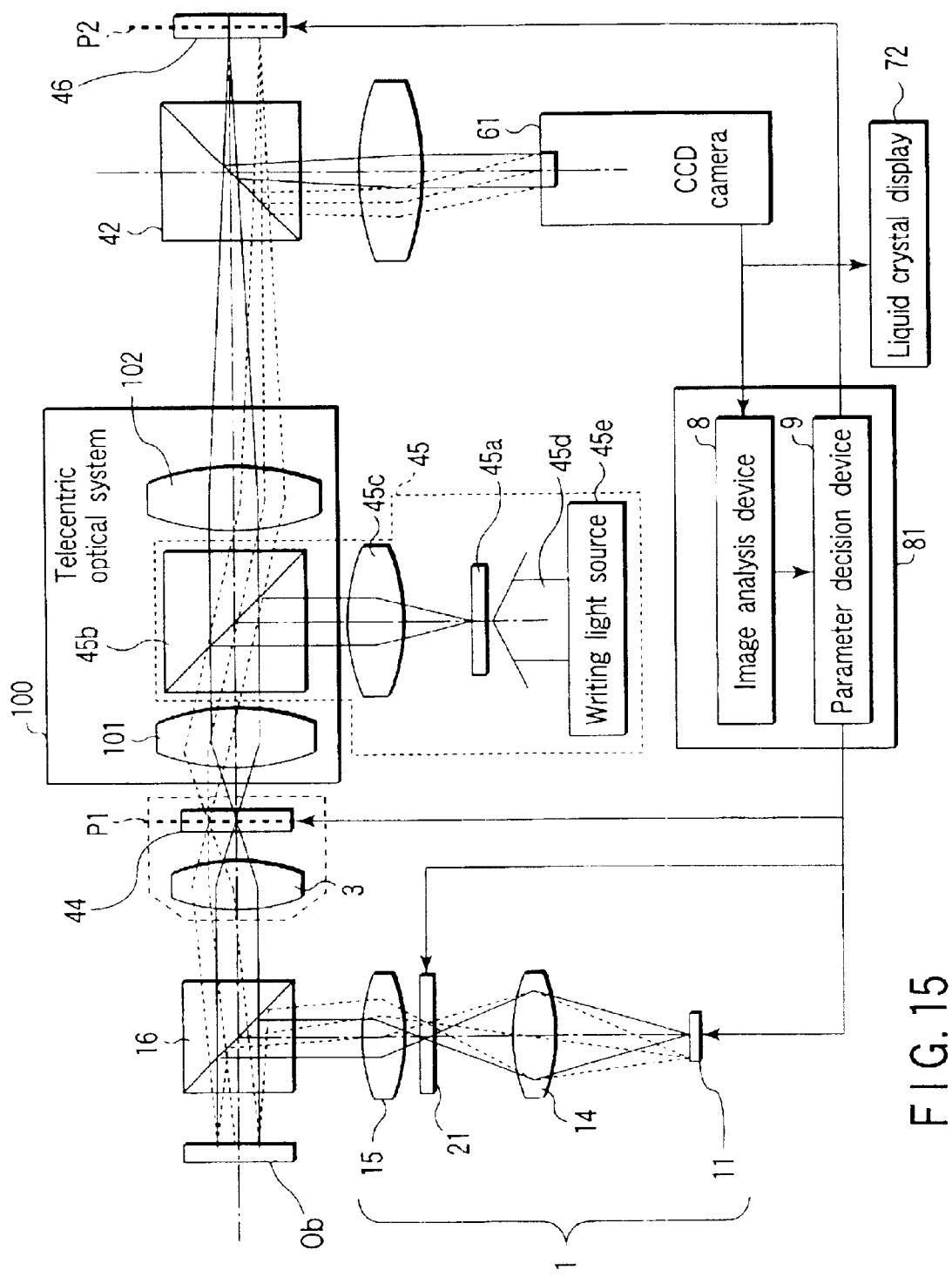
F I G. 15

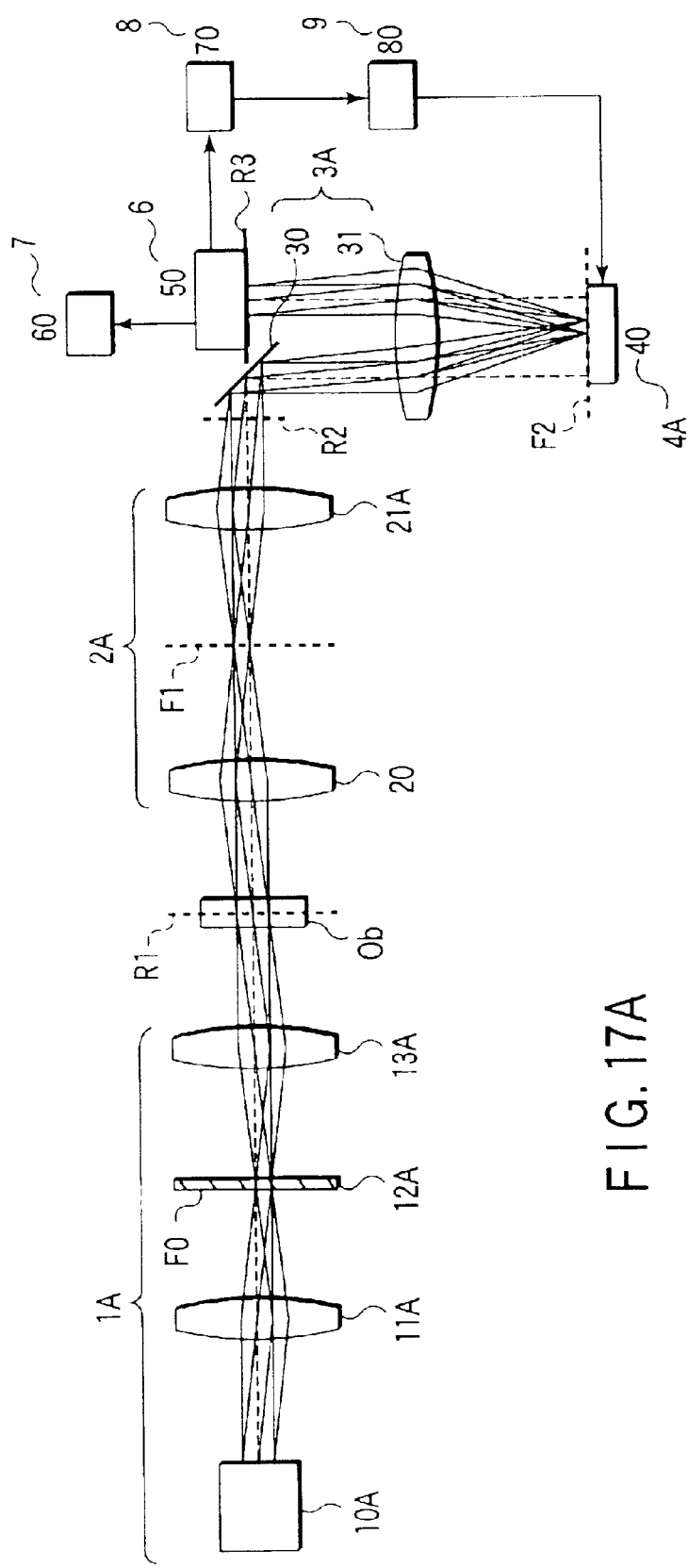
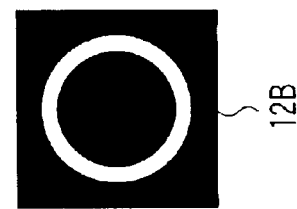
FIG. 17A
FIG. 17B

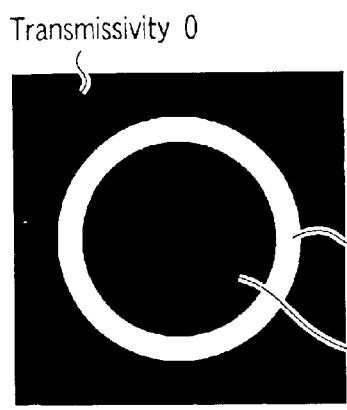
F I G. 21A
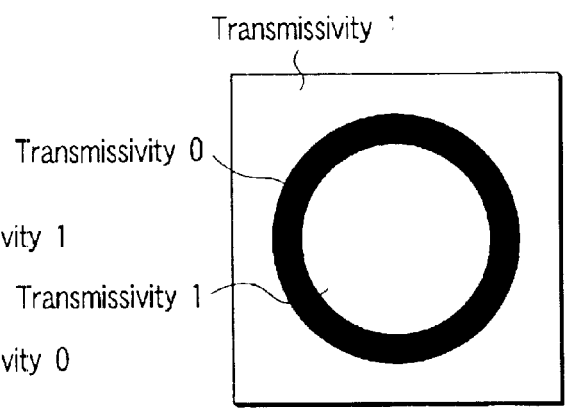
F I G. 21B
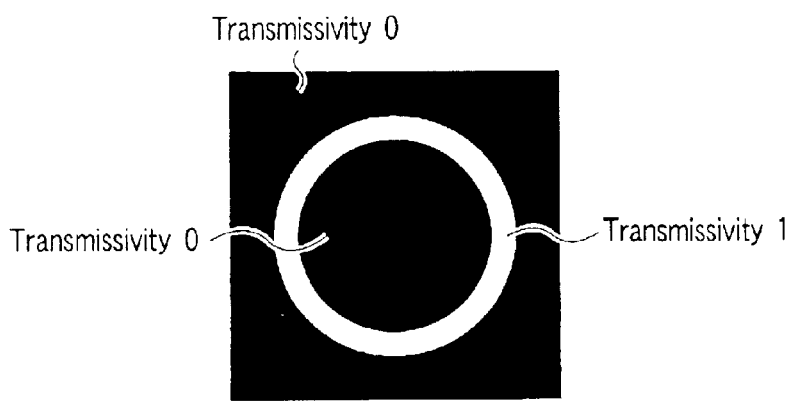
F I G. 23A
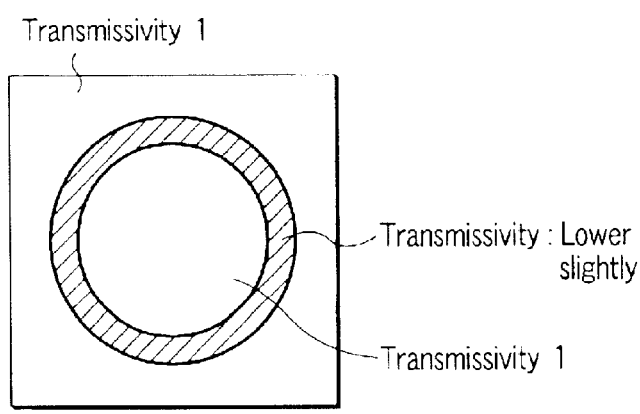
F I G. 23B
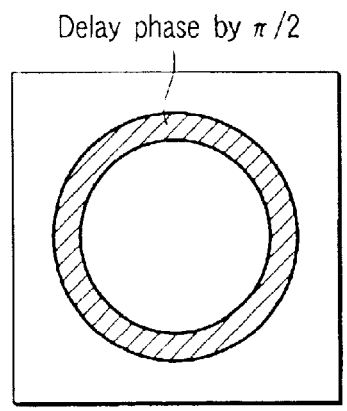
F I G. 23C

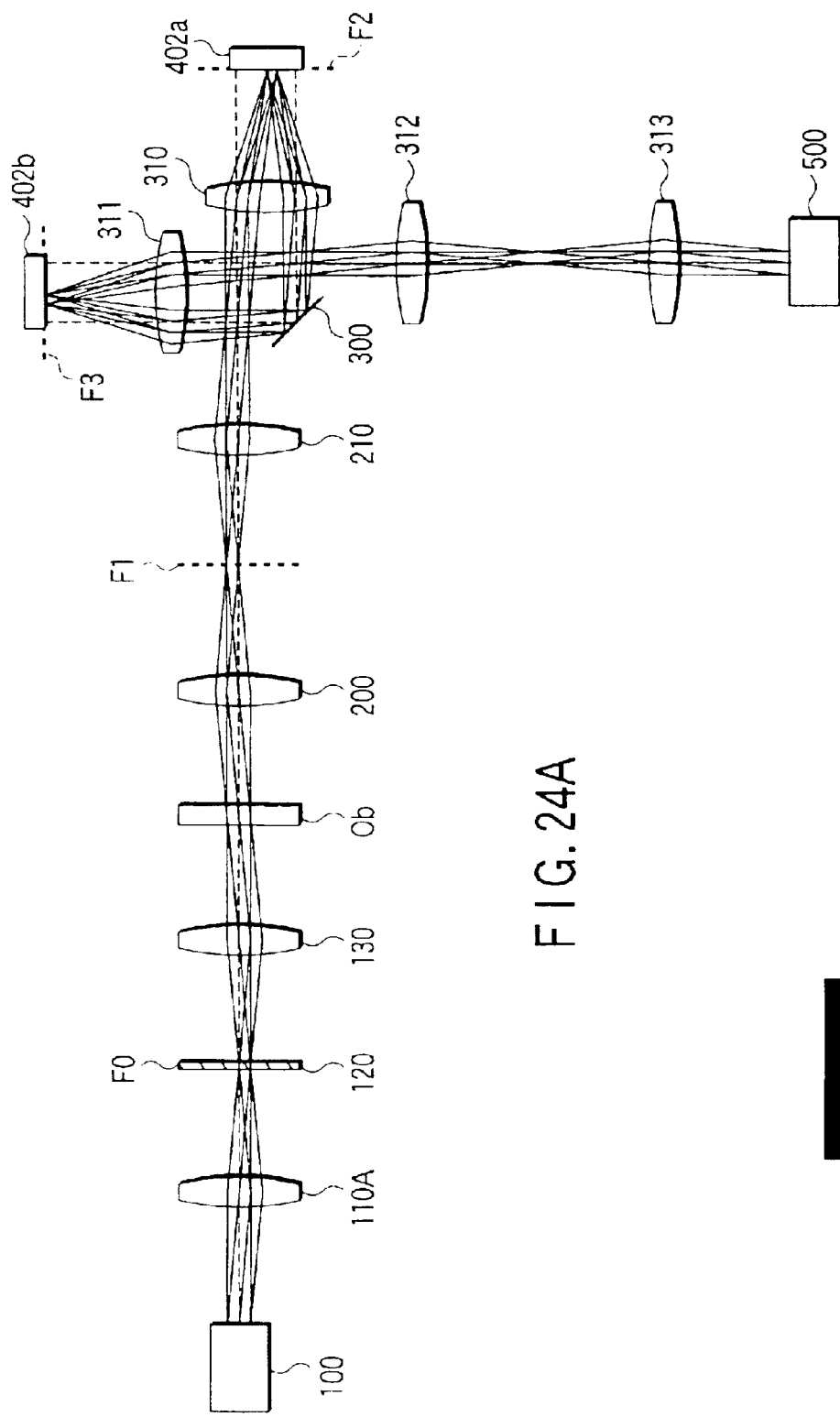
F I G. 24A
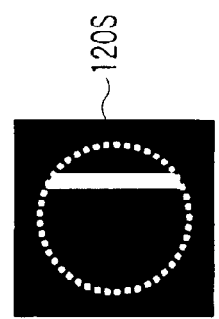
F I G. 24B

VERSATILE MICROSCOPE SYSTEM WITH MODULATING OPTICAL SYSTEM

CROSS-REFERENCE TO RELATED APPLICATIONS

This application is based upon and claims the benefit of priority from the prior Japanese Patent Applications No. 2001-242635, filed Aug. 9, 2001; and No. 2002-192665 filed Jul. 1, 2002, the entire contents of both of which are incorporated herein by reference.

BACKGROUND OF THE INVENTION

1. Field of the Invention

The present invention relates to a microscope system, and more particularly to a microscope having a modulating optical system for modulating a luminous flux from an object as a versatile microscopic apparatus, and an image analysis method using the same.

2. Description of the Related Art

Generally, the microscope requires various adjustments in order to obtain favorable images, such as adjustment of aperture stop and field stop, modulation on a pupil plane, and other adjustments depending on the object of observation and NA of objective lens.

A typical example is a phase contrast microscope.

The phase contrast microscope is briefly explained by referring to a schematic diagram in FIG. 26.

In the following explanation, a light incident direction to a lens system is called the front side, and an exit direction is the rear side.

That is, a luminous flux emitted from a light source such as halogen lamp or a secondary light source 501 based thereon passes through a collector lens 502 disposed so that the vicinity of the front side focus plane coincide with the light source 501, and is focused on a stop 503 disposed on the rear side focus plane of the collector lens.

On the surface of the stop, a ring-shaped opening is disposed, and the luminous flux passing through the ring-shaped opening enters an object 505 through a condenser lens 504.

The luminous flux entering the object 505 passes through an objective lens 506, and the intensity and phase are modulated on a pupil plane on which a pupil modulating element 507 for modulating the pupil is disposed.

On the pupil plane, O-order component of the luminous light passing through the ring-shaped opening and passing through the object 505 is modulated by reducing the transmissivity and advancing the phase by $\pi/2$ (or delaying by $\pi/2$).

The modulated luminous flux passing through an imaging lens 508 disposed so that its front side focus plane substantially coincides with the pupil plane, and a phase image of the object 505 is formed on a rear side focus plane 509 of the imaging lens 508.

In the phase difference microscope shown in FIG. 26, in order to obtain a favorable image if the thickness or absorption of the object 505 is changed, it is required to adjust the transmissivity or phase of the pupil plane by the pupil modulating element 507. However, usually the pupil modulating element 507 is realized by a fixed film by coating, and cannot be adjusted.

Accordingly, by using liquid crystal, electrochromic or the like as the pupil modulating element 507, a microscopic apparatus capable of adjusting by controlling voltage to be applied to such element is disclosed, for example, in Jpn. Pat. Appln. KOKAI Publication No. 58-184115 and Jpn. Pat. Appln. KOKAI Publication No. 9-80313.

Going one step ahead, by combining the phase pupil modulation with the lighting system modulation such as dark field lighting, bright viewing field lighting and oblique lighting, a microscopic apparatus further advanced in versatility is disclosed in Jpn. Pat. Appln. KOKAI Publication No. 56-137324.

According to these prior arts, by using the element capable of modulating variably the lighting system and the pupil plane, it suggests possibility of composing the microscopic apparatus capable of enhancing the versatility of observation without mechanically moving a member such as turret or the like.

Actually, however, as the versatility is enhanced, it is more difficult to set the optimum value in the variable portion.

If attempted to simplify them, it is easy for those skilled in the art to consider to select by tabulating parameters of optimum variable elements depending on every method of observation or condition of the objects.

In this case, the objects may be reduced to a certain extent, but if desired to handle various objects accurately, more parameter tables are needed, and handling is more complicated.

To the contrary, if the number of tables is decreased to avoid such complicated handling, it is hard to achieve optimum handling in more objects.

Thus, in the microscopic apparatus of the prior art, it is hard to set various parameters by the variable pupil modulating element introduced for achieving the versatility optimally in various objects in a wide range, which is one of the serious problems for achieving the practical use.

BRIEF SUMMARY OF THE INVENTION

It is an object of the invention to present a microscope as a versatile microscopic apparatus capable of obtaining images of optimum image quality simply and accurately, in various objects in a wide range, and an image analysis method using the same.

In order to achieve the above object, according to a first aspect of the present invention, there is provided a microscope comprising:

an illuminating device which emits light from a light source to an object, and generates a luminous flux including information of the object;

an illuminating light modulating device which modulates at least one of wavelength, phase, intensity, polarization, and coherency of the light emitted to the object by the illuminating device;

an objective lens and an imaging lens which focus the luminous flux including the information of the object to form the image of the object;

a pupil modulating device which is disposed near a pupil plane of the objective lens, and modulates at least one of phase, intensity and direction of polarization of the luminous flux including the information of the object;

an image pickup device which is disposed on a plane on which the image of the object is formed by the objective lens and the imaging lens, and picks up the image of the object;

an image display device which displays the image of the object picked up by the image pickup device;

an image analysis device which analyzes the image of the object picked up by the image pickup device; and a parameter decision device which adjusts the modulation amounts of the illuminating light modulating device and the pupil modulating device by using the image information of the object analyzed by the image analysis device.

According to a second aspect of the present invention, there is provided a microscope recited in the first aspect, wherein the pupil modulating device is a pupil modulating device of reflection type.

According to a third aspect of the present invention, there is provided a microscope recited in the second aspect, wherein the pupil modulating device of reflection type is disposed so that the central ray of the luminous flux entering the pupil modulating device of reflection type intersects with the perpendicular of the reflection plane of the pupil modulating device of reflection type.

According to a fourth aspect of the present invention, there is provided a microscope recited in the third aspect, further comprising a lens which passes both the luminous flux entering the pupil modulating device of reflection type and the luminous flux reflected by the pupil modulating device of reflection type, wherein the pupil modulating device and the lens are disposed so that each luminous flux passes through a different position of the lens.

According to a fifth aspect of the present invention, there is provided a microscope recited in the fourth aspect, further comprising a reflection member which allows the luminous flux entering the pupil modulating device of reflection type and the luminous flux reflected by the pupil modulating device of reflection type to advance in a mutually different optical path.

According to a sixth aspect of the present invention, there is provided a microscope recited in the fifth aspect, wherein the reflection member is disposed so that the reflected light of the reflection member enters the lens which passes both the luminous flux entering the pupil modulating device of reflection type and the luminous flux reflected by the pupil modulating device of reflection type.

According to a seventh aspect of the present invention, there is provided a microscope recited in the first aspect, wherein the pupil modulating device is a spatial light modulator of photo address type composed of a writing light source, a spatial light modulating element, and an imaging lens, further comprising:

a pupil data writing device which writes into the spatial light modulator of photo address type on the basis of the modulation amount adjusted by the parameter decision device.

According to an eighth aspect of the present invention, there is provided a microscope recited in the first aspect, wherein the illuminating light modulating device modulates at least one of wavelength, intensity, direction of polarization, and coherency of the luminous flux from the light source on the basis of the modulation amount adjusted by the parameter decision device.

According to a ninth aspect of the present invention, there is provided a microscope recited in the first aspect, wherein at least one pupil transmission optical system is disposed between the objective lens and the imaging lens, a plane conjugate with the pupil pane of the objective lens is set between the objective lens and the imaging lens by the pupil transmission optical system, the pupil modulating device is disposed near the conjugate plane, and the pupil transmission optical system is a telecentric optical system composed of a first lens group and a second lens group, with a rear side focus plane of the first lens group and a front side focus plane of the second lens group coinciding substantially with each other, and the front side focus plane of the first lens group substantially coinciding with the pupil plane of the objective lens.

According to a tenth aspect of the present invention, there is provided a microscope recited in the first aspect, wherein the image analysis device analyzes the fidelity or resolution of the image, and analyzes the quality of the image.

According to an eleventh aspect of the present invention, there is provided a microscope recited in the ninth aspect, wherein the parameter decision device determines the modulation amounts of the illuminating light modulating device and the pupil modulating device by using predetermined functions by using the fidelity or resolution of the image analyzed by the image analysis device as the variable.

According to a twelfth aspect of the present invention, there is provided a microscope recited in the ninth aspect, wherein the image display device has a graphical user interface to display the image analysis value analyzed by the image analysis device and input the modulation amounts of the illuminating light modulating device and the pupil modulating device.

According to a thirteenth aspect of the present invention, there is provided a microscope comprising:

illuminating means for emitting light from a light source to an object, and generating a luminous flux including information of the object;

illuminating light modulating means for modulating at least one of wavelength, phase, intensity, polarization, and coherency of the light emitted to the object by the illuminating means;

an objective lens and an imaging lens which focus the luminous flux including the information of the object to form the image of the object;

pupil modulating means disposed near a pupil plane of the objective lens, for modulating at least one of phase, intensity and direction of polarization of the luminous flux including the information of the object;

image pickup means disposed on a plane on which the image of the object is formed by the objective lens and the imaging lens, for picking up the image of the object;

image display means for displaying the image of the object picked up by the image pickup means;

image analysis means for analyzing the image of the object picked up by the image pickup means; and parameter decision means for adjusting the modulation amounts of the illuminating light modulating means and the pupil modulating means by using the image information of the object analyzed by the image analysis means.

According to a fourteenth aspect of the present invention, there is provided a microscope recited in the thirteenth aspect, wherein the pupil modulating means is pupil modulating means of reflection type.

According to a fifteenth aspect of the present invention, there is provided a microscope recited in the fourteenth aspect, wherein the pupil modulating means of reflection type is disposed so that the central ray of the luminous flux entering the pupil modulating means of reflection type intersects with the perpendicular of the reflection plane of the pupil modulating means of reflection type.

According to a sixteenth aspect of the present invention, there is provided a microscope recited in the fifteenth aspect, further comprising a lens which passes both the luminous flux entering the pupil modulating means of reflection type and the luminous flux reflected by the pupil modulating means of reflection type, wherein the pupil modulating means and the lens are disposed so that each luminous flux passes through a different position of the lens.

According to a seventeenth aspect of the present invention, there is provided a microscope recited in the fifteenth aspect, further comprising a reflection member which allows the luminous flux entering the pupil modulating means of reflection type and the luminous flux reflected by the pupil modulating means of reflection type to advance in a mutually different optical path.

According to an eighteenth aspect of the present invention, there is provided a microscope recited in the seventeenth aspect, wherein the reflection member is disposed so that the reflected light of the reflection member enters the lens which passes both the luminous flux entering the pupil modulating means of reflection type and the luminous flux reflected by the pupil modulating means of reflection type.

According to a nineteenth aspect of the present invention, there is provided a microscope recited in the thirteenth aspect, wherein the pupil modulating means is a spatial light modulator of photo address type composed of a writing light source, a spatial light modulating element, and an imaging lens, further comprising:

pupil data writing means for writing into the spatial light modulator of photo address type on the basis of the modulation amount adjusted by the parameter decision means.

According to a twentieth aspect of the present invention, there is provided a microscope recited in the thirteenth aspect, wherein the illuminating light modulating means modulates at least one of wavelength, intensity, direction of polarization, and coherency of the luminous flux from the light source on the basis of the modulation amount adjusted by the parameter decision means.

According to a twenty-first aspect of the present invention, there is provided a microscope recited in the thirteenth aspect, wherein at least one pupil transmission optical system is disposed between the objective lens and the imaging lens, a plane conjugate with the pupil pane of the objective lens is set between the objective lens and the imaging lens by the pupil transmission optical system, the pupil modulating means is disposed near the conjugate plane, and the pupil transmission optical system is a telecentric optical system composed of a first lens group and a second lens group, with a rear side focus plane of the first lens group and a front side focus plane of the second lens group coinciding substantially with each other, and the front side focus plane of the first lens group substantially coinciding with the pupil plane of the objective lens.

According to a twenty-second aspect of the present invention, there is provided a microscope recited in the thirteenth aspect, wherein the image analysis means analyzes the fidelity or resolution of the image, and analyzes the quality of the image.

According to a twenty-third aspect of the present invention, there is provided a microscope recited in the twenty-first aspect, wherein the parameter decision means determines the modulation amounts of the illuminating light modulating means and the pupil modulating means by using predetermined functions by using the fidelity or resolution of the image analyzed by the image analysis means as the variable.

According to a twenty-fourth aspect of the present invention, there is provided a microscope recited in the twenty-first aspect, wherein the image display means has a graphical user interface to display the image analysis value analyzed by the image analysis means, and input the modulation amounts of the illuminating light modulating means and the pupil modulating means.

According to a twenty-fifth aspect of the present invention, there is provided an image analysis method using a microscope comprising:

preparing an illuminating device which emits light from a light source to an object, and generates a luminous flux including information of the object;

preparing an illuminating light modulating device which modulates at least one of wavelength, phase, intensity, polarization, and coherency of the light emitted to the object by the illumination;

preparing an objective lens and an imaging lens which focus the luminous flux including the information of the object to form the image of the object;

modulating at least one of phase, intensity and direction of polarization of the luminous flux including the information of the object by a pupil modulating device to be disposed near a pupil plane of the objective lens;

forming the image of the object by an image pickup device to be disposed on a plane on which the image of the object is formed by the objective lens and the imaging lens;

displaying the image of the object picked up by the image pickup device;

analyzing the image of the object picked up by the image pickup device; and adjusting the modulation amounts of the illuminating light modulating device and the pupil modulating device by using the analyzed image information of the object.

According to the first, thirteenth and twenty-fifth aspects of the invention, various modulations can be applied to the illuminating light and the luminous flux on the pupil plane of the object lens, with respect to the wavelength, intensity, phase, polarization or coherency, and it is possible to realize a versatile microscope capable of observing the bright viewing field, dark field, phase constant, difference interference, polarization, Hoffman modulation contrast observation, and the like, and an image analysis method using the same.

According to the first and thirteenth aspects of the invention, the image analysis device (means) and parameter determining device (means) are provided. Thus, in these various observation methods, it is possible to observer easily and optimally without requiring replacement or adjustment of mechanical members in a same configuration, in various objects differing in various physical quantities such as thickness, structure and absorption of the objects.

According to the second and fourteenth aspects of the invention, the reflection type modulation device (means) represented by liquid crystal of photo address type is capable of modulating without requiring transmission of light through the control member, and stray light such as diffraction light in the reflection type modulation device (means) can be avoided, so that a favorable image can be obtained if modulated.

According to the third and fifteenth aspects of the invention, since the incident light and the reflected light with respect to the reflection type modulation device (means) pass through different optical paths, effects of stray light due to return of reflected light to the incident side can be easily removed.

According to the fourth and sixteenth aspects of the invention, by using the same lens for forming the image transmission optical system at the incident side and the reflection side with respect to the reflection type modulation device (means), the image transmission optical system can be composed in a smaller number of Lenses than when using different lenses, so that the optical system can be reduced in size.

According to the fifth, sixth, seventeenth and eighteenth aspects of the invention, the since the luminous flux at the incident side and the luminous flux at the reflection side with respect to the reflection type modulation device can be separated from each other, the stray light due to return of reflected light to the incident side can be removed easily and completely.

According to the seventh and nineteenth aspects of the invention, the pupil plane of the objective lens is disposed inside of the lens barrel of the objective lens, and the pupil modulation device (means) largely limited in installation mechanically in structure is composed of a spatial light modulator of photo address type. Therefore, as compared with the case of composing by using the spatial light modulator of electric address type, leading of wiring to outside can be eliminated, and it is possible to compose with less mechanical restriction.

According to the eight and twentieth aspects of the invention, the wavelength, intensity, phase, polarization, or coherency can be modulated directly.

According to the ninth and twenty-first aspects of the invention, the pupil plane of the objective lens is located inside of the lens barrel of the object lens, and the pupil modulation device (means) largely limited in installation mechanically in structure is disposed newly at the outside of the objective lens by the pupil transmission optical system. Therefore, without significantly changing the configuration from the illuminating means to the objective lens in the microscopic optical system widely used hitherto, effective pupil converting device (means) may be added to them.

In particular, according to the ninth and twenty-first aspects of the invention, by using a telecentric optical system, it is possible to expand the allowable range of the position of installation of the pupil modulating device (means) to be installed near the plane conjugate with the pupil plane newly provided outside of the objective lens. As a result, a more accurate modulation may be realized by the pupil modulating device (means).

According to the tenth and twenty-second aspects of the invention, the configuration of the image analysis device (means) is defined more specifically. According to this configuration, the quantity concerning the quality of the image can be objectively quantized regardless of the individual difference or presence or absence of experience, so that various parameters for obtaining the optimum images can be set stably and accurately.

According to the eleventh and twenty-third aspects of the invention, the configuration of the parameter determining device (means) is defined more specifically. According to this configuration, various parameters for obtaining the adequate image can be set easily and accurately.

According to the twelfth and twenty-fourth aspects of the invention, the configuration of the parameter determining device (means) is defined more specifically. According to this configuration, various parameters for obtaining the adequate image can be set objectively, and easily and accurately.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

FIG. 8 is a block diagram showing a configuration of a versatile microscopic apparatus according to a third example of the first embodiment of the invention;

FIG. 13 is a block diagram showing a configuration of a versatile microscopic apparatus according to a second embodiment of the invention;

FIG. 15 is a block diagram showing a configuration of a versatile microscopic apparatus according to a second example of the second embodiment of the invention;

FIG. 17A is a block diagram showing a configuration of a microscopic apparatus according to a third embodiment of the invention;

FIG. 17B is a view showing the shape of an opening 12B disposed in the vicinity of a stop 12A in FIG. 17A;

FIGS. 21A and 21B are views showing a pattern displayed in a liquid crystal spatial light modulating element 400 in FIG. 20A;

FIGS. 23A, 23B and 23C are views showing patterns displayed in a first liquid crystal spatial light modulating element 403a and a second liquid crystal spatial light modulating element 403b in FIG. 22A;

FIG. 24A is a block diagram showing a configuration of a microscopic apparatus according to a third example of the third embodiment of the invention;

FIG. 24B is a view showing the shape of a ring-shaped opening 120S disposed in the vicinity of a stop 120 in FIG. 24A;

DETAILED DESCRIPTION OF THE INVENTION

Figure 1:
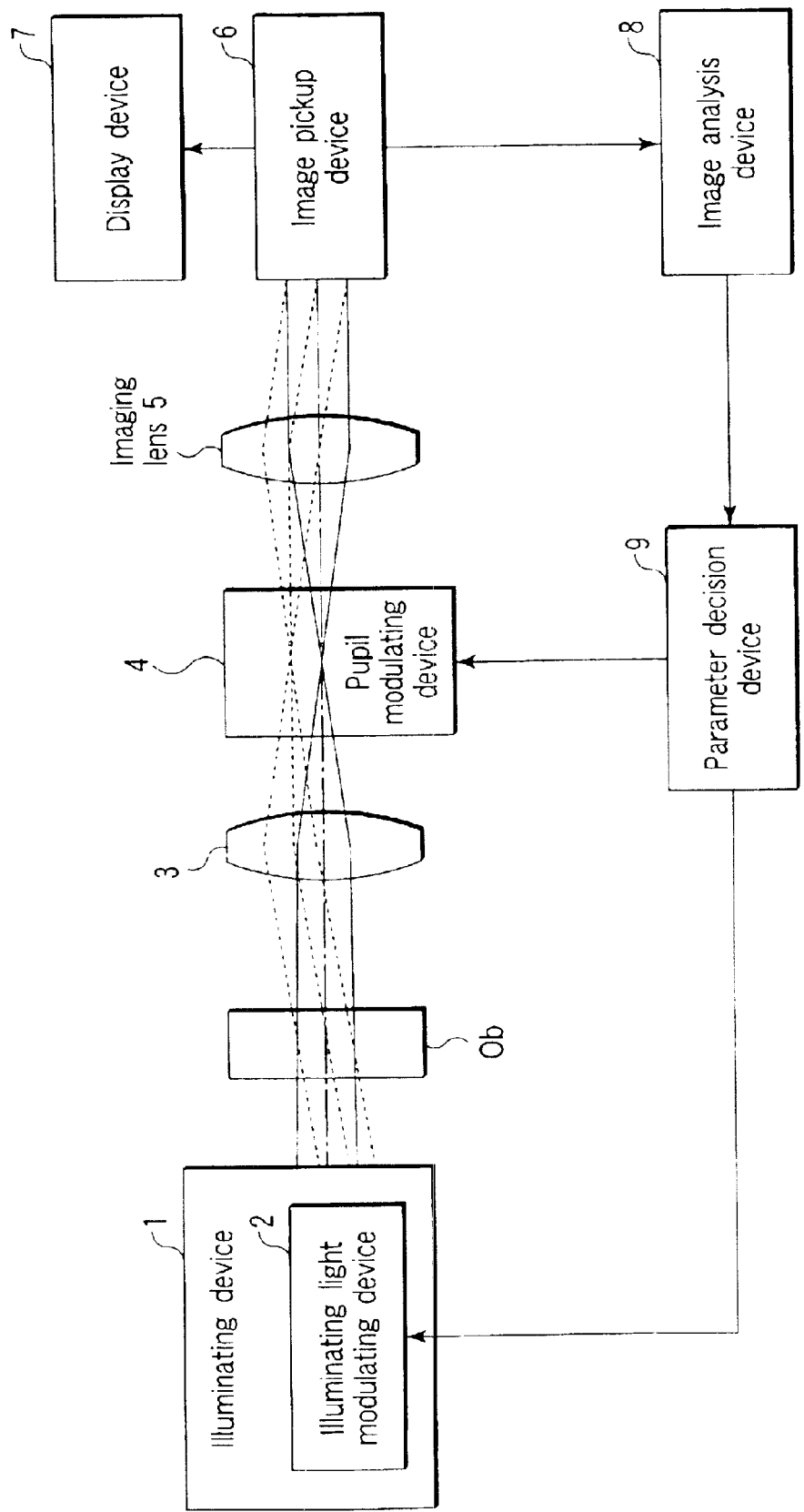
FIG. 1 is a block diagram showing a configuration of a microscopic apparatus according to a first embodiment of the invention.

Reference will now be made in detail to the presently preferred embodiments of the invention as illustrated in the accompanying drawings, in which like reference numerals designate like or corresponding parts.

Referring now to the drawings, preferred embodiments of the invention will be described below.

(First Embodiment)

FIG. 1 is a block diagram showing a configuration of a microscopic apparatus according to a first embodiment of the invention.

That is, as shown in FIG. 1, the microscopic apparatus in the first embodiment of the invention comprises: an illuminating device 1 for generating a luminous flux for reading out information of the object and emitting the luminous flux to the object; an illuminating light modulating device 2 for modulating at least one of phase, intensity, and direction of polarization of the luminous flux; an objective lens 3 and an imaging lens 5 for forming an image of the object by the luminous flux reading out the information of the object; an image pickup device 6 for picking up the image of the object; a pupil modulating device 4 disposed near the pupil plane of the objective lens 3, for modulating at least one of phase, intensity, and direction of polymerization; a display device 7 for displaying the observed image acquired in the image pickup device 6; and an image analysis device 8 and a parameter decision device 9 for determining the modulation amounts of the illuminating light modulating device 2 and the pupil modulating device 4 so that the observed image is optimum in image quality (excellent in resolution and fidelity) based on data of the observed image acquired in the image pickup device 6, and feeding back the determined modulation amounts to the devices 2, 4.

In this microscopic apparatus having such configuration, the luminous flux generated in the illuminating device 1 is modulated in phase, intensity or direction of polarization by the illuminating light modulating device 2, and the modulated luminous flux reads out the information of the object Ob.

The luminous flux reading out the information of the object Ob enters the objective lens 3, and is further modulated in phase, intensity, or direction of polarization by the pupil modulating device 4 in the vicinity of the pupil plane of the objective lens 3.

The luminous flux modulated by the pupil modulating device 4 further enters the imaging lens 5, and an image is formed, and this image is picked up by the image pickup device 6 as the image of the object (observed image).

The observed image acquired in the image pickup device 6 is sent to the display device 7, and is displayed so as to be observed directly by a user.

At the same time, the observed image is also sent to the image analysis device 8, in which the observed image is analyzed.

The analysis data obtained as a result of image analysis in the image analysis device 8 is sent to the parameter decision device 9.

In the parameter decision device 9, on the basis of the analysis data, the modulation amounts of the illuminating light modulating device 2 and the pupil modulating device 4 are determined so that the observed image is optimum in image quality, and the determined modulation amounts are transmitted for feedback.

On the basis of the transmitted modulation amounts, the modulation amounts of the illuminating light modulating device 2 and the pupil modulating device 4 are changed, and the same process is repeated. Therefore various objects differing in thickness, structure, absorption and other physical quantities can be optimally observed in the same configuration, in various methods of observation, without requiring exchange or adjustment of mechanical members or the like.

In particular, by using the image analysis device 8 and the parameter decision device 9, very simple and optimum observation is possible regardless of the individual difference of users or presence or absence of experience.

These modulations by the illuminating light modulating device 2 and the pupil modulating device 4 are executed in continuous values. As compared with the conventional microscopes of stationary type or member exchange type, fine setting of modulation amount is realized, so that a wide range of objects can be observed optimally.

FIRST EXAMPLE

Figure 2:
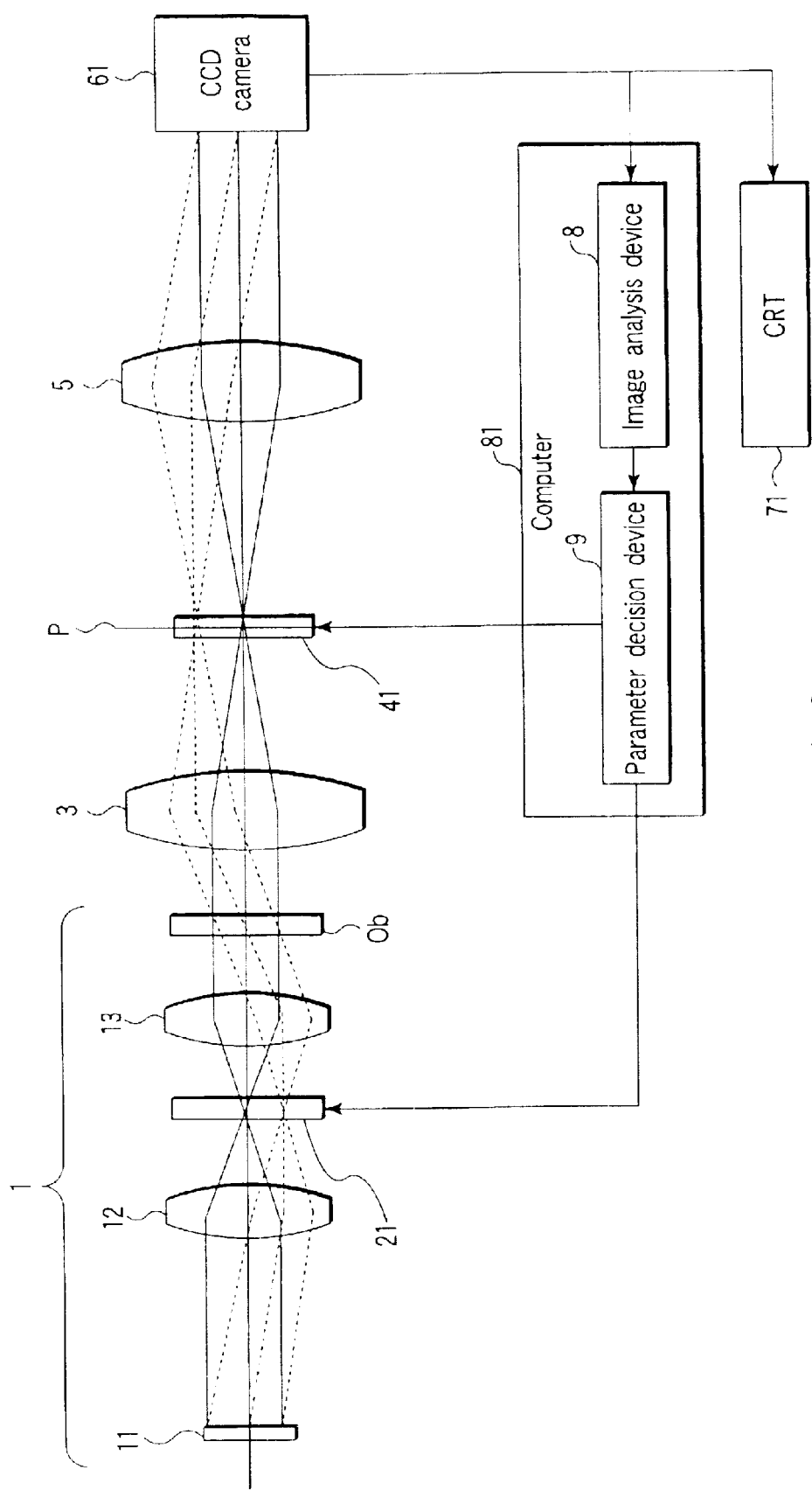
FIG. 2 is a block diagram showing a configuration of a versatile microscopic apparatus according to a first example of the first embodiment of the invention.

FIG. 2 is a block diagram showing a configuration of a versatile microscopic apparatus according to a first example of the first embodiment of the invention.

That is, as shown in FIG. 2, the versatile microscopic apparatus in the first example of the first embodiment of the invention comprises: an illuminating device 1 composed of a mercury lamp as a light source 11, and illuminating lens 12 and 13; a liquid crystal spatial light modulating element 21 of transmission type, electric address type, and intensity modulation type as the illuminating light modulating device 2, the objective lens 3, a liquid crystal spatial light modulating element 41 of transmission type, electric address type, and intensity modulation type same as the liquid crystal spatial light modulating element 21 as the pupil modulating device 4; the imaging lens 5; a CCD camera 61 as the image pickup device 6; a CRT 71 shared with a display element of a computer 81 as the display device 7; and the image analysis device 8 and the parameter decision device 9 both realized by the software in the computer 81.

The luminous flux from the mercury lamp as the light source 11 enters the illuminating lens 12 disposed so that a front side focus plane thereof coincides substantially with the light source position, and the luminous flux from the mercury lamp is focused on a rear side focus plane thereof.

Near the rear side focus plane of the illuminating lens 12, the liquid crystal spatial light modulating element 21 of transmission type, electric address type, and intensity modulation type is disposed, and the intensity of the desired position with respect to the incident luminous flux is modulated by a signal from the parameter decision device 9 entering through controller and a driver (not shown).

The luminous flux modulated in intensity by the liquid crystal spatial light modulating element 21 passes through the illuminating lens 13 of which front side focus plane is disposed to coincide substantially with the modulation plane of the element 21, and enters the object Ob.

Herein, the lighting device 1 is composed in a so-called critical illumination.

The luminous flux entering the object Ob reads out the information of the object Ob to be incident to the objective lens 3.

The luminous flux entering the objective lens 3 forms a Fourier image of the object Ob on the pupil plane of the objective lens 3.

The liquid crystal spatial light modulating element 41 of transmission type, electric address type, and intensity modulation type is disposed in the vicinity of the pupil plane P of the objective lens. In the same manner as in the liquid crystal spatial light modulating element 21, the liquid crystal spatial light modulating element 41 also modulates the intensity at a specified position with respect to the incident luminous flux by the signal from the parameter decision device 9 to be inputted through a controller and a driver (not shown).

The luminous flux modulated passes through the imaging lens 5 disposed so that its front side focus plane coincides substantially with the modulation plane of this element 41, and the modulated image of the final result is focused on the imaging plane of the CCD camera 61 which is the image pickup device 6, and the information (observed image) is acquired by the CCD camera 61.

In this example, for instance, a method of observation similar to the dark field microscope is shown.

Figure 3A:
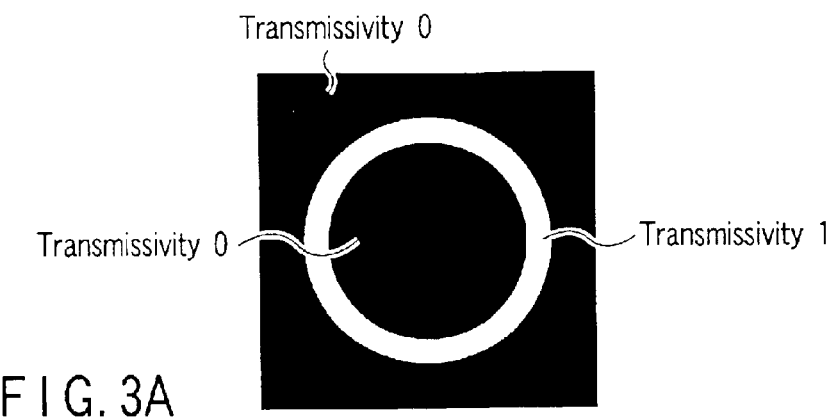
FIG. 3A is a view showing a ring pattern displayed in a liquid crystal spatial light modulating element 21 for illumination modulation in FIG. 2.

In this case, a ring pattern as shown in FIG. 3A is displayed in the liquid crystal spatial light modulating element 21 for illumination modulation (in the diagram, the white portion corresponds to the portion of transmissivity of 1, and the solid black portion corresponds to the portion of transmissivity of 0).

Figure 3B:
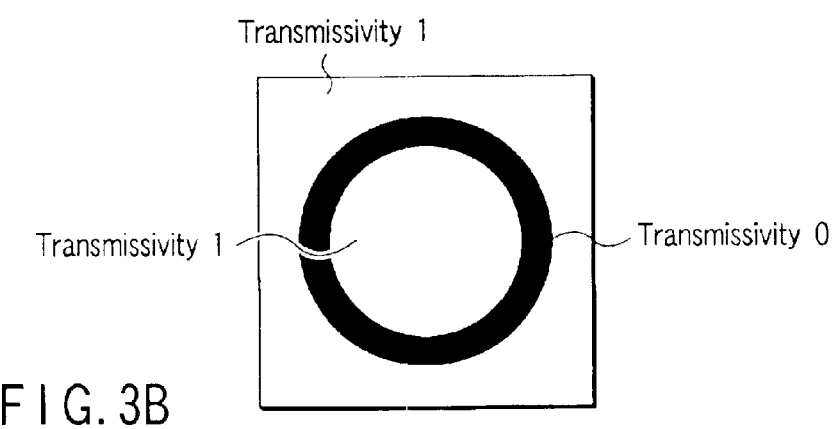
FIG. 3B is a view showing a ring pattern displayed in a liquid crystal spatial light modulating element 41 for pupil modulation in FIG. 2.

On the other hand, in the liquid crystal spatial light modulating element 41 for pupil modulation, in the absence of the object, a pattern similar to the pattern displayed in the liquid crystal spatial light modulating element 21 is focused, but a ring pattern as shown in FIG. 3B is displayed so that the transmissivity is 0 in the luminous flux focused portion, and the transmissivity is 1 in the other portion.

By this modulation, the low frequency component of the object is cut off, and only the high frequency component scattered by the object Ob passes, so that same processing as in the ordinary dark field microscope is processed.

The observed image acquired by this image pickup device 6 is sent to a frame memory (not shown) in the computer 81, and is accumulated as digital data.

Figure 4:
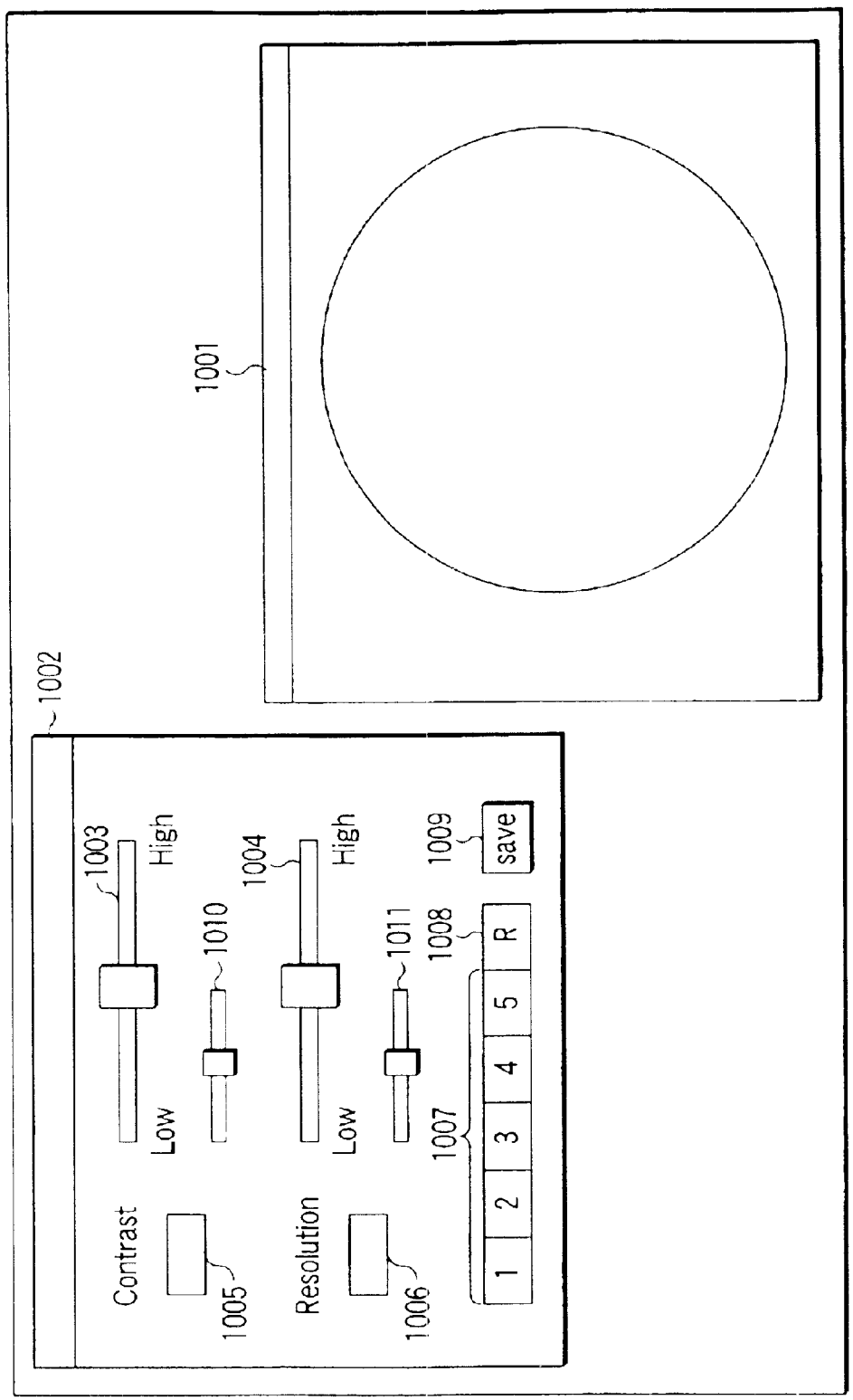
FIG. 4 is a view showing a graphical user interface (GUI) screen displayed on a CRT 71 as a display device in FIG. 2.

The accumulated data is sent to the CRT 71 which is the display device 7, so that the observer can directly observe the observed image (see window 1001 in the lower right corner in FIG. 4).

At the same time, the data is also sent to the image analysis device 8.

In the image analysis device 8, using this image data, the physical quantity relating to the image quality of this image is analyzed.

On the other hand, the parameters of the liquid crystal spatial light modulating element 21 and the liquid crystal spatial light modulating element 41 are ring diameter, ring width, transmissivity in the ring, and transmissivity out of the ring of the pattern displayed.

In this example, the image analysis device 8 determines the contrast as the amount relating to the fidelity, and the amount of high frequency component in the image as the amount relating to the resolution.

These parameter values are determined by the functions preliminarily determined by the variables of the amount analyzed in the parameter decision device 9 and the image analysis device 8 (in this example, the contrast and the amount of high frequency component in the image), and the determined parameter values are fed back to the controller of the illuminating light modulating device 2 and pupil modulating device 4.

Specifically, the functions of the example are set as follows:

$$(x_{i+1})^j = (x_i)^j + f_j(\alpha u_i, \beta v_i)$$

$$(y_{i+1})^j = (y_i)^j + g_j(\alpha u_i, \beta v_i)$$

wherein $(x_i)^j$ and $(y_i)^j$ are respectively the ring diameter (j=0), ring width (j=1), transmissivity in the ring (j=2), and transmissivity out of the ring (j=3) of the pattern given to the liquid crystal spatial light modulating element 21 and the liquid crystal spatial light modulating element 41, and subscript i denotes the number of times of updating.

Further, $u_i$ and $v_i$ are amounts of high frequency components relating to the contrast and resolution analyzed by the image analysis device 8, and subscript i denotes the number of times of updating same as above.

Symbols $\alpha$ and $\beta$ are coefficients relating to change of contrast and resolution, respectively.

$f_j$ and $g_j$ are functions of parameters j relating to change of contrast and resolution, which are set separately for each multiplying factor of the objective lens.

At the time of initial start-up, these parameters are set at initial values, respectively.

When an observer observes the observed image on the display processed by the parameters, and desires to change the image, the observer manipulates a graphical user interface (GUI) screen 1002 shown in the upper left corner of FIG. 4.

For example, to change the contrast, a button of a bar 1003 on the GUI screen 1002 is moved right or left by the mouse.

Specifically, to lower the contrast, move the button of the bar 1003 to the left side, or to raise the contrast, move the button of the bar 1003 to the right side.

Similarly, to change the resolution, a button of a bar 1004 on the GUI screen 1002 is moved right or left by the mouse.

Specifically, to lower the resolution, move the button of the bar 1004 to the left side, or to raise the resolution, move the button of the bar 1004 to the right side.

In this way, in proportion to the moving extent of the button by the user, the value of $\alpha$ and $\beta$ are set, the left side of the center is a plus coefficient, and the right side is a minus one, and each button returns to the center on every feedback.

Reference numerals 1005 and 1006 on the GUI screen 1002 are display units of the values analyzed by the image analysis device 8.

Reference numeral 1007 is a preset button for reading out and storing temporarily respective parameter values.

When the preset button 1007 is pressed after pushing a save button 1009 on the GUI screen 1002, it is set in recording state, and when the preset button 1007 is pressed directly, the parameters recorded in advance are loaded.

Reference numeral 1008 on the GUI screen 1002 is a reset button for returning them to initial values.

Reference numerals 1010 and 1011 are bar and button for adjusting the functions $\alpha$ and $\beta$ relating to change of the contrast and resolution.

By the bar 1010 and button 1011, by repeating operation until satisfied by the observer, an optimum image can be obtained.

This example realizes a microscopic apparatus capable observing optimum images easily and accurately in a wide range of various objects.

Herein, an example of ring modulation pattern is shown, but the configuration of the example is not limited to this pattern alone, and it is applicable to various observation methods by displaying other patterns.

SECOND EXAMPLE

Figure 5:
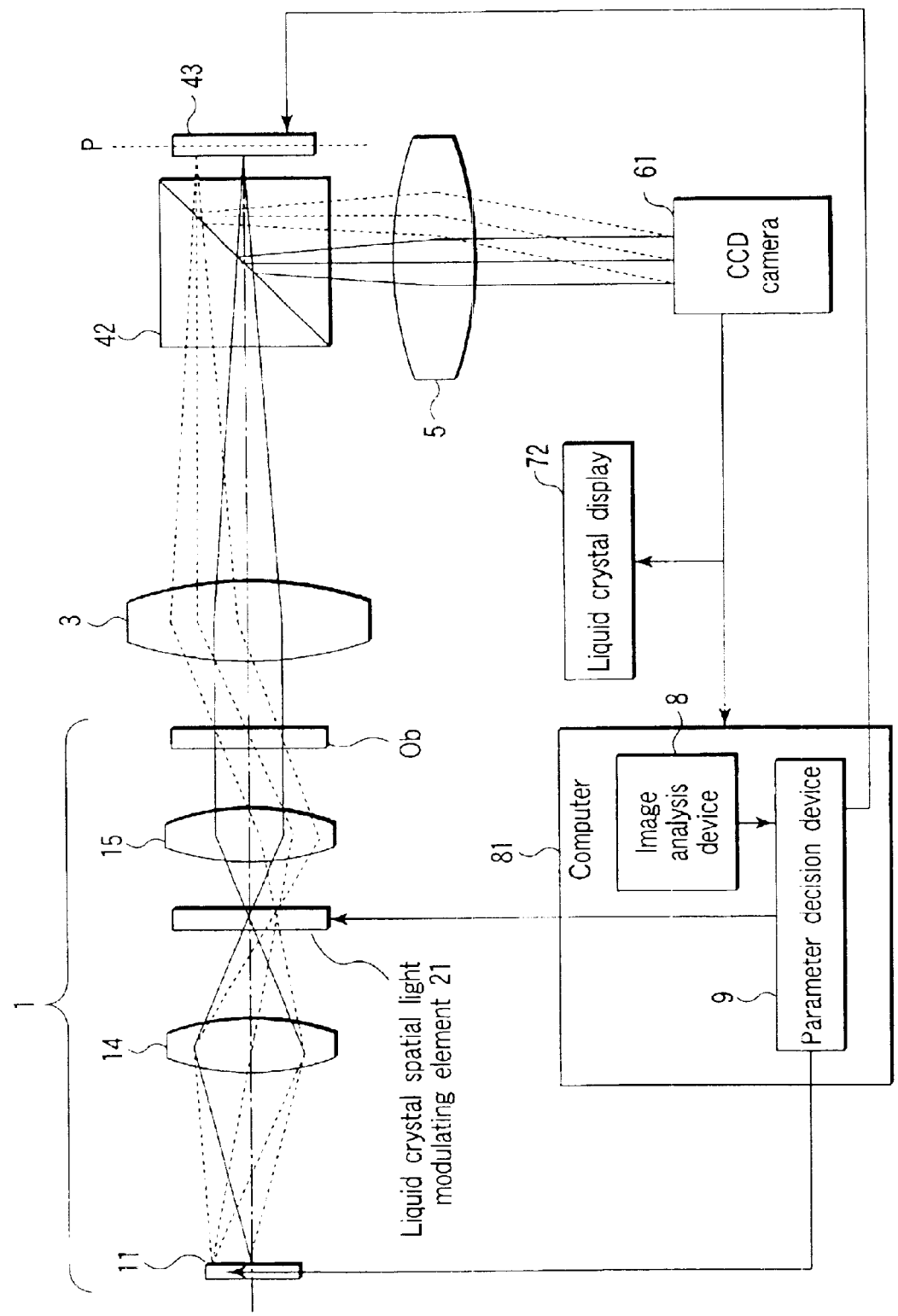
FIG. 5 is a block diagram showing a configuration of a versatile microscopic apparatus according to a second example of the first embodiment of the invention.

FIG. 5 is a block diagram showing a configuration of a versatile microscopic apparatus according to a second example of the first embodiment of the invention.

That is, the versatile microscopic apparatus in the second example of the first embodiment of the invention is, as shown in FIG. 5, similar to the first example of the first embodiment except for the following points: the light source 11 of the illuminating device 1 is replaced by a halogen lamp, and a controller and a driver (not shown) are connected so as to vary its intensity by a signal from the parameter decision device 9; the configuration of illuminating lens is changed; a liquid crystal spatial light modulating element 43 of reflection type and electric address type, capable of modulating both intensity and phase is disposed as the pupil modulating device 4, and accordingly a polarizing beam splitter 42 is disposed between the objective lens 3 and the pupil plane P of the objective lens; a liquid crystal display 72 is provided aside from the CRT of the computer as the display device 7; and the amount to be analyzed by the image analysis device 8 and the function format of the parameter decision device 9 are changed.

As shown in FIG. 5, the luminous flux from the halogen lamp as the light source 11 passes through the illuminating lens 14 and reaches the liquid crystal spatial light modulating element 21 of transmission type, electric address type, and intensity modulation type.

At this time, the illuminating lens 14 is disposed so that the image of the halogen lamp is focused on the liquid crystal spatial light modulating element 21.

The luminous flux focused on the liquid crystal spatial light modulating element 21 is modulated by this element 21, and passes through an illuminating lens 15 disposed so that the front side focus plane substantially coincide with the imaging plane of the light source 11, that is, the modulating plane of the liquid crystal spatial light modulating element 21, thereby being incident to the object Ob.

This illuminating device 1 is composed in a so-called Kehler illumination.

The luminous flux entering the object Ob reads out the information of the object Ob to be incident to the objective lens 3.

The luminous flux entering the objective lens 3 passes through the polarizing beam splitter 42, and a Fourier image of the object Ob is formed on the pupil plane P of the objective lens 3.

Near the pupil plane P of the objective lens 3, the liquid crystal spatial light modulating element 43 of reflection type and electric address type, capable of modulating both intensity and phase is disposed.

Figure 6:
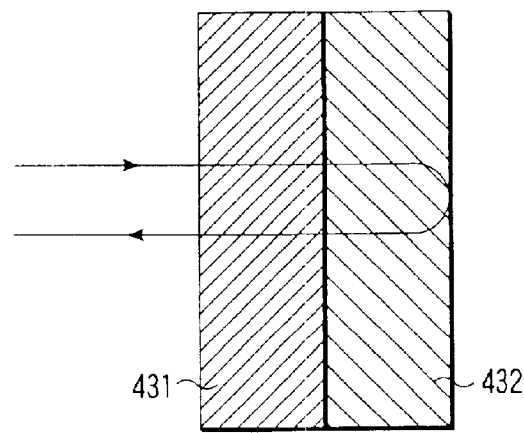
FIG. 6 is a diagram showing a configuration comprising an intensity modulator 431 and a phase modulator 432 as a specific example of a liquid crystal spatial light modulating element 43 for pupil modulation in FIG. 5.

This liquid crystal spatial light modulating element 43 is a combination of two modulators, that is, an intensity modulator 431 comprising liquid crystal of electric address type, transmission type, and intensity modulation type, and a phase modulator 432 comprising liquid crystal of electric address type, reflection type, and phase modulation type as shown in FIG. 6. Therefore, both phase and intensity can be modulated in a luminous flux in a specific direction of polarization.

The luminous flux reflected by the liquid crystal spatial light modulating element 43 and further reflected by the polarizing beam splitter 42 becomes a luminous flux modulated in both intensity and phase, and passes through the imaging lens 5 disposed so that its front side focus plane substantially coincide with the pupil plane. The image as a result of modulation is focused and reproduced on the imaging plane of the CCD camera 61 as the image pickup device.

In this example, for instance, processing same as in phase contrast microscope is explained.

Figure 7A:
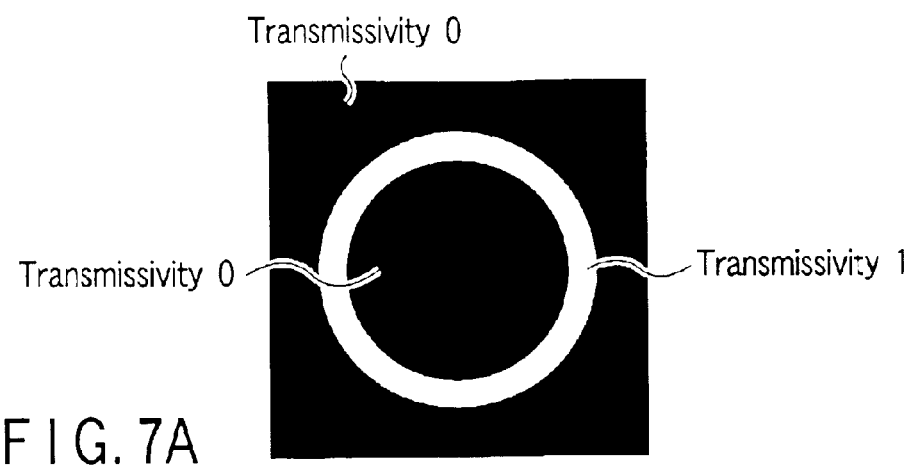
FIG. 7A is a view showing a ring pattern displayed in a liquid crystal spatial light modulating element 21 for illumination modulation in FIG. 5.

First, in the liquid crystal spatial light modulating element 21 for illumination modulation, a ring pattern as shown in FIG. 7A is displayed (in the diagram, the white portion corresponds to the portion of transmissivity of 1, and the solid black portion corresponds to the portion of transmissivity of 0).

Figure 7B:
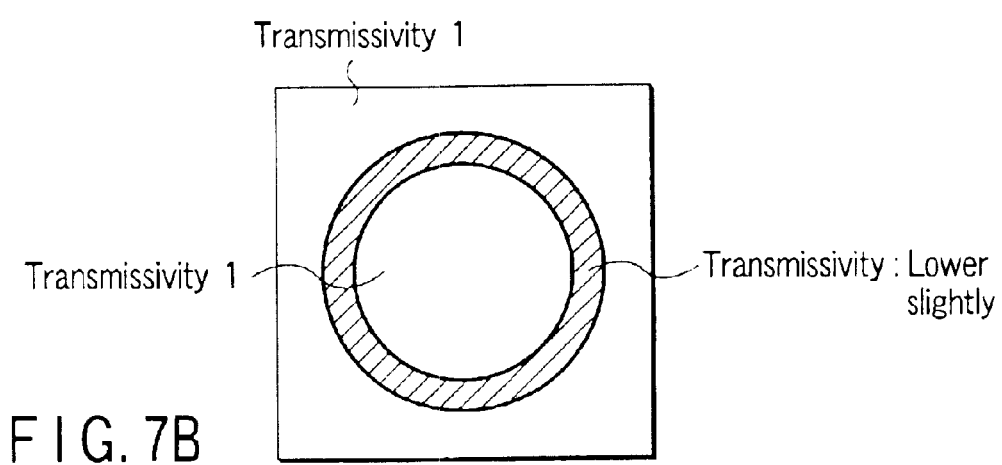
FIG. 7B is a view showing a ring pattern modulated in an intensity by intensity modulator 431 of a liquid crystal spatial light modulating element 43 for pupil modulation in FIG. 5.

On the other hand, in the liquid crystal spatial light modulating element 43 for pupil modulation, in the absence of the object, a pattern similar to the pattern display in the liquid crystal spatial light modulating element 21 is focused. However, the ring pattern is modulated by the intensity modulator 431 as shown in FIG. 7B so that the transmissivity may be slightly lower in the luminous flux imaging area (shaded portion in the diagram) while the transmissivity may be 1 in other area (white portion in the diagram).

Figure 7C:
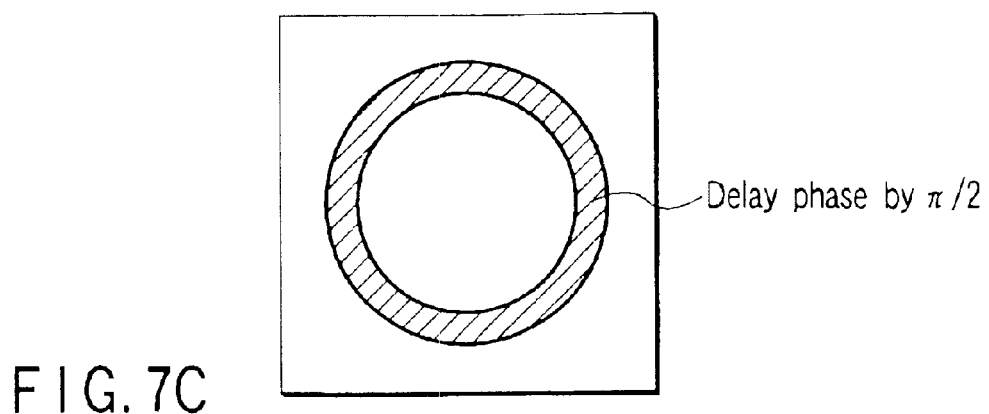
FIG. 7C is a view showing a ring pattern modulated in phase by a phase modulator 432 of the liquid crystal spatial light modulating element 43 for pupil modulation in FIG. 5.

Further, the ring pattern is modulated in phase by the phase modulator 432 as shown in FIG. 7C so that phase is delayed by $\pi/2$ in the area (shaded portion in the diagram) corresponding to the area where the luminous flux of the intensity modulator 431 is imaged.

By thus processing in this example, same process as in ordinary phase contrast microscope is realized.

As compared with the first example of using the transmission type pupil modulating device (transmission type liquid crystal spatial light modulating element), it is more advantageous in the reflection type pupil modulating device (liquid crystal spatial light modulating element 43) used in this example because the optical path length is longer for the total size of the microscopic apparatus.

Specifically, in this example, the optical path of entering the reflection type liquid crystal spatial light modulating element 43 from the beam splitter 42 (optical path of incident light) and the optical path of entering the beam splitter 42 again from the reflection type liquid crystal spatial light modulating element 43 (optical path of reflected light) share the same space.

Accordingly, in this example, it is possible that the size can be reduced by the portion corresponding to the portion sharing the same space as compared with the case of using the transmission type liquid crystal spatial light modulating element.

The image information acquired by the CCD camera 61 is sent to the liquid crystal display 72 as the display device 7, and the observer can directly observe the observed image.

At the same time, the image information acquired by the CCD camera 61 is sent to the image processing board with frame memory (not shown) in the computer 81, and converted into digital data.

The data is further sent to the image analysis device 8.

In this case, the image analysis device 8 is realized by the software and the image processing board in the computer 81, and the physical quantity relating to the quality of the image is analyzed by using the image data.

In this example, the image analysis device 8 determines the contrast and the total quantity of light as the quantity relating to the fidelity.

On the other hand, the common parameters of the reflection type liquid crystal spatial light modulating element 21 and reflection type liquid crystal spatial light modulating element 43 are the ring diameter, ring width, transmissivity in the ring and transmissivity out of the ring of each pattern. The phases in and out of the ring are further added in the reflection type liquid crystal spatial light modulating element 43, and the parameter of the light source is the intensity of the light source.

These parameter values are determined by the parameter decision device 9 realized by the software in the computer 81 by setting a specified function, using the quantities analyzed by the image analysis device 8 (contrast and total quantity of light in this example) as variables, and the determined parameter values are fed back to the illuminating light modulating device 2, pupil modulating device 4, and controller of the light source 11.

Specifically, functions in this example are set as follows:

$(x_{i+1})^j = (x_i)^j + \xi f_j'(u_i - u_0, w_i - w_0)$ $(y_{i+1})^j = (y_i)^j + \delta g_j'(u_i - v_0, w_i - w_0)$ $(z_{i+1})^j = (z_i)^j + \zeta h_j'(u_i - v_0, w_i - w_0)$ where $(x_i)^j$ and $(y_i)^j$ are respectively the ring diameter (j=0), ring width (j=1), transmissivity in the ring (j=2), and transmissivity out of the ring (j=3) of the pattern given to the liquid crystal spatial light modulating element 21 and the liquid crystal spatial light modulating element 43, and further the phase in the ring (j=4) and phase out of the ring (j=5) in the liquid crystal spatial light modulating element 43, $z_i$ is the intensity of the light source, and subscript i denotes the number of times of updating.

Further, $u_i$ and $w_i$ are the contrast and total quantity of light analyzed by the image analysis device 8, and subscript i denotes the number of times of updating same as above.

Moreover, $u_0$ and $w_0$ are respectively the standard value or user's set value, and subscript i denotes the number of times of updating same as above.

The standard value is a value preset as the average by preparing several types of standard samples, recording the images by an existing phase contrast microscope set optimally to the samples, putting them into the image analysis device 8 of the computer 81, and analyzing the contrast and the total brightness, and this value can be set individually by the user.

Also, $f_j'$, $g_j'$, and $h_j'$ are respectively functions of parameters j relating to change of contrast and total quantity of light, which are set separately for each multiplying factor of the objective lens.

Symbols $\xi$, $\delta$, $\zeta$ are coefficients acting on the function, which are decreased depending on the number of times of updating.

At the time of initial start-up, these parameters are set at initial values, respectively.

By entering the upper limit of the number of times of updating from the GUI (not shown), analysis of the processing results and determination of parameters are done automatically as mentioned above by the image analysis device 8 and the parameter decision device 9, so that the image quality is enhanced.

The GUI (not shown) comprises, same as in the first example, preset and save buttons for reading out or temporarily storing the parameter values, and a display unit for displaying the contrast and total quantity of light analyzed by the image analysis device 8.

The second example realizes a microscopic apparatus capable observing optimum images easily and accurately in a wide range of various objects.

In this example, moreover, both phase and intensity can be modulated by the pupil, not limited to the phase contrast microscope, the example is basically very versatile and applicable to a wide range of observation methods.

THIRD EXAMPLE

FIG. 8 is a block diagram showing a configuration of a versatile microscopic apparatus according to a third example of the first embodiment of the invention.

That is, the versatile microscopic apparatus in the third example of the first embodiment of the invention is, as shown in FIG. 8, similar to the first example of the first embodiment except for the following points: the light source 11 of the illuminating device 1 is replaced by a superluminescent diode (SLD), and a controller and a driver (not shown) are connected so as to vary the intensity by a signal from the parameter decision device 9; a photorefractive spatial light modulating element 44 of transmission type, phase modulation type, and photo address type is disposed at a pupil plane P inside of a lens barrel 31 of the objective lens 3; a pupil modulation data writing device 45 composed of a liquid crystal display spatial light modulating element 45a of intensity modulation type, transmission type, and electric address type, a polarizing beam splitter 45b, an imaging lens 45c, and a writing light source 45e for generating a substantially collimating writing luminous flux 45d is disposed for writing the amount of modulation to the photorefractive spatial light modulating element 44 at the pupil plane; and the amount to be analyzed by the image analysis device 8 and the function format of the parameter decision device 9 are changed.

As shown in FIG. 8, in this example, same as in the first example, the luminous flux generated in the SLD as the light source 11 in the illuminating device 1 is modulated same as in the first example, by the illuminating lens 12, liquid crystal spatial light modulating element 21 of transmission type, electric address type, and intensity modulation type, and illuminating lens 13 to be incident to the object Ob. The luminous flux further reads out the information of the object Ob, and is put into the objective lens 3.

The luminous flux entering the objective lens 3 forms a Fourier image of the object Ob on the pupil plane P in the lens barrel of the objective lens 3.

Near the pupil plane P of the objective lens 3, the photorefractive spatial light modulating element 44 of phase modulation type and photo address type is disposed.

The amount of modulation of the phase in the photorefractive spatial light modulating element 44 is determined by the quantity of light of the image data to be written on the light writing plane in the element. Thus, the modulation amount of the phase is written on the light writing lane in the element as the intensity information by the pupil modulation data writing device 45.

The pupil modulation data writing device 45 sends the signal relating to the modulation amount of the phase from the parameter decision device 9 to the liquid crystal spatial light modulating element 45a of intensity modulation type, transmission type, and electric address type through the controller and driver (not shown), and the information is displayed.

This information is read out by the substantially collimating writing luminous flux 45d emitted from the laser diode (LD), and passes through the imaging lens 45c and polarizing beam splitter 45b, and is transmitted to focus an image on the light writing plane of the photorefractive spatial light modulating element 44.

The luminous flux modulated in phase by passing through the photorefractive spatial light modulating element 44 on which the information of the phase modulation is thus superposed further passes through the polarizing beam splitter 45b installed between the objective lens 3 and imaging lens 5. The luminous flux is focused on the imaging plane of the CCD camera 61 by the imaging lens 5 same as in the first example, and is taken as the observed image.

In this example, the case of observation method same as in the differential interference microscope is explained.

Figure 9A:
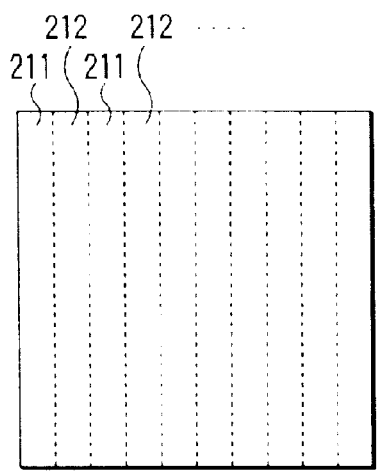
FIG. 9A is a view showing a grating pattern composed of repetition of first grating portion 211 and second grating portion 212 displayed in a liquid crystal spatial light modulating element 21 for illumination modulation.

In this case, a grating pattern composed of repetition of first grating portion 211 and second grating portion 212 as shown in FIG. 9A is formed in the liquid crystal spatial light modulating element 21 for illumination modulation.

In this example, however, since the transmissivity of all grating displayed in the liquid crystal spatial light modulating element 21 for illumination modulation is 1, it is substantially a plane of uniform transmissivity, and a grating pattern is formed only when the transmissivity is changed.

In FIG. 9A, the broken line shows the boundary of the first portion 211 and second portion 212 of the grating pattern.

Figure 9B:
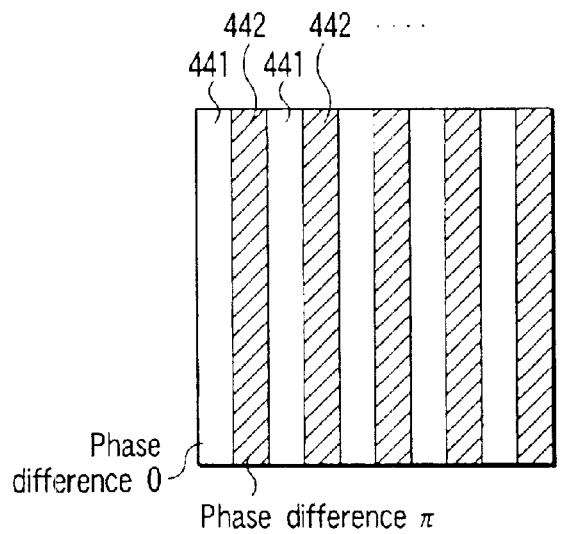
FIG. 9B is a view showing a pattern of phase difference modulated into grating composed of repetition of 0 and $\pi$ by a photorefractive spatial light modulating element 44 for pupil modulation.

On the other hand, in the photorefractive spatial light modulating element 44 for pupil modulation, in the absence of the object, same as in the first example, a pattern similar to the pattern display in the liquid crystal spatial light modulating element 21 is focused, but as shown in FIG. 9B, grating modulation is executed by repetition of the phase difference of 0 (portion of reference numeral 441 in the diagram) and phase difference of $\pi$ (portion of reference numeral 442 in the diagram).

By such modulation near the pupil plane, light of degree 0 and diffracted light of degree +1 and degree −1 are produced, and the luminous fluxes by these diffracted lights are focused and overlapped on the imaging plane of the CCD camera 61, and the shear amount is slightly larger, but the same observation as in the differential interference microscope is enabled.

The observed image acquired by the image pickup device 6 is sent to the CRT 71 as the display device 7 same as in the first example, and the observer can directly observe the observed image.

At the same time, the observed image is converted into digital data, and is sent to the image analysis device 8.

This image analysis device 8 is realized, same as in the first example, by the software in the computer 81. In this example, it determines the contrast, total brightness and unevenness as the quantity relating to the fidelity, and further the quantity about the edge in the image as the quantity relating to the resolution.

On the other hand, the parameters of the reflection type liquid crystal spatial light modulating element 21 and the photorefractive spatial light modulating element 44 are the grating pitch and width of pattern, and the transmissivity or phase in the grating, and the parameter of the light source 11 is the intensity of the light source 11.

As the parameter decision device 9, neutral network is realized by the software in the computer 81.

By preparing standard samples of several types of thickness in advance, and recording the images by the existing differential interference microscope being set optimally to them, they are inputted into the image analysis device 8 in the computer 81.

Next, analyzing the contrast, total brightness and uneven, and further the quantity about the edge in the image, and using the standard value set as the average thereof, the relation between the quantity analyzed in the image analysis device 8 and each parameter is approximated in function by learning within the neutral network.

In this neutral network, determining the parameter values by using the approximated function format, they are fed back to the liquid crystal spatial light modulating element 21, the liquid crystal spatial light modulating element 45a, and the controller of the light source 11.

Specifically, functions in this example are expressed as follows:

$$x^i = f_j^n(u, v, w, \mu)$$

$$y^i = g_j^n(u, v, w, \mu)$$

$$z^i = h_j^n(u, v, w, \mu)$$

where f", g", and h" are functions of parameters j of the liquid crystal spatial light modulating element 21, liquid crystal spatial light modulating element 45a, and light source 11 relating to change in the amount of contrast, resolution, total brightness and unevenness, and are set separately for each multiplying factor of the objective lens.

Further, $x^j$ and $y^j$ are grating pitch (j=0), grating width (j=1), transmissivity in the portion 211 (J=2), and transmissivity in the portion 212 (J=3) of the pattern given to the liquid crystal spatial light modulating element 21 and the liquid crystal spatial light modulating element 45a, and z is the intensity of the light source.

Moreover, u, v, w and μ are respectively the contrast, amount of edge relating to the resolution, total brightness, and amount relating to the unevenness which are analyzed by the image analysis device 8.

Herein, $y^j$ relates to the liquid crystal spatial light modulating element 45a to which the information is transmitted directly from the parameter decision device 9, instead of the photorefractive spatial light modulating element 44. However, there is no problem at all because the relation of the both parameters is determined as one by one.

As for the GUI, although not shown specifically, the contrast, amount of edge relating to the resolution, total brightness, and amount relating to the unevenness which are analyzed by the image analysis device 8 are displayed.

The user is allowed to adjust finely the function setting of the neutral network by instructing the change of the analyzed values by the bar and button same as in the first example.

There are also preset button and save button for reading out of temporarily storing set values of parameters, and a reset button for returning these set values to initial values.

The third example thus realizes a microscopic apparatus capable of observing objects of any thickness within the standard sample range quite easily and optimally, by setting optimum parameters automatically by the image analysis device 8 and the parameter decision device 9.

FOURTH EXAMPLE

Figure 10:
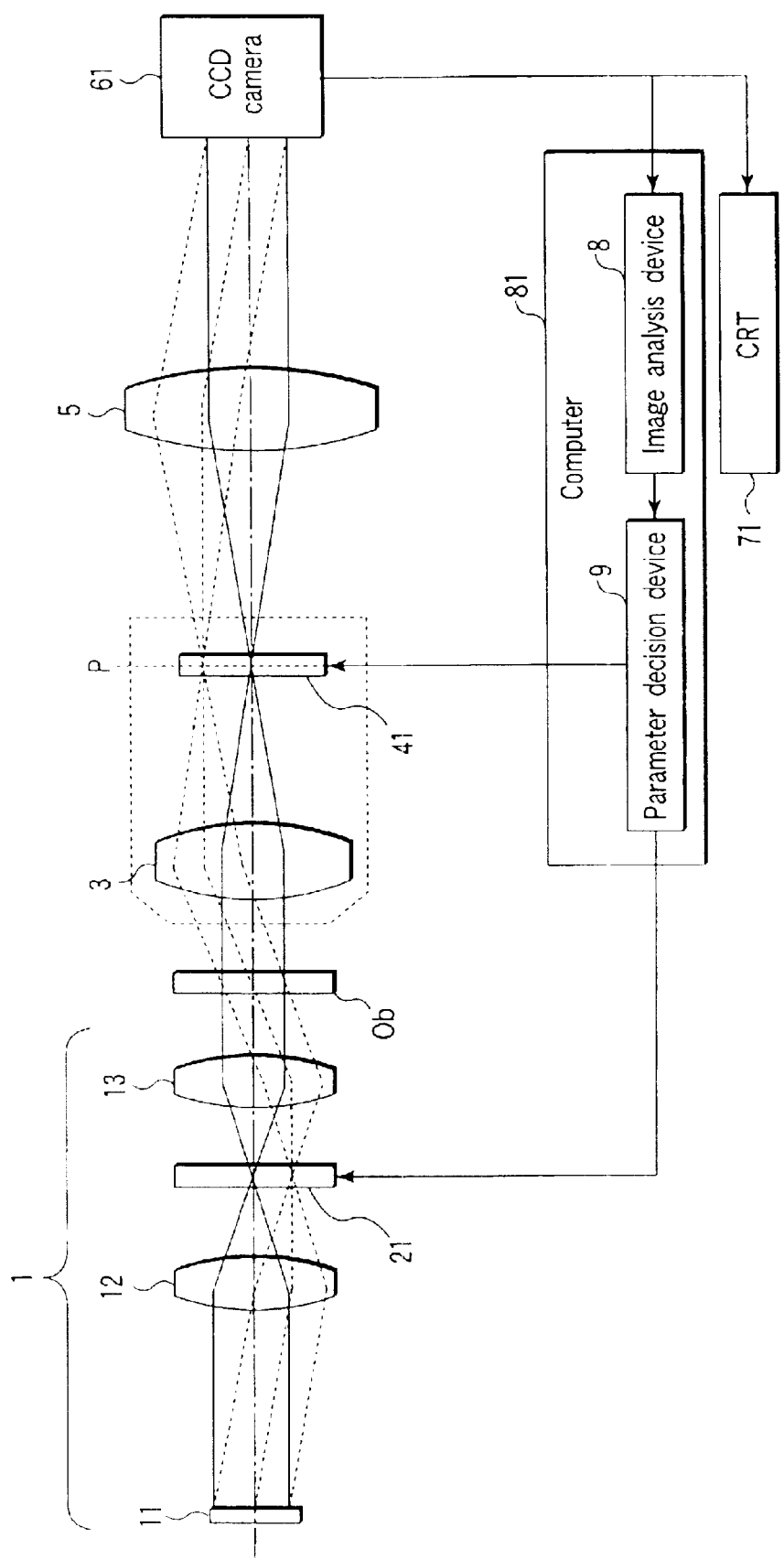
FIG. 10 is a block diagram showing a configuration of a versatile microscopic apparatus according to a fourth example of the first embodiment of the invention.

FIG. 10 is a block diagram showing a configuration of a versatile microscopic apparatus according to a fourth example of the first embodiment of the invention.

That is, the versatile microscopic apparatus in the fourth example of the first embodiment of the invention is, as shown in FIG. 10, similar to the first example of the first embodiment except for the following points: the pupil plane of the objective lens 3 is placed within the lens barrel of the objective lens 3; and the analysis items of the image analysis device 8 and the portion of the parameter decision device 9 are changed.

This example shows a case of observation method similar to Hoffman modulation contrast observation using an oblique illumination.

Figure 11A:
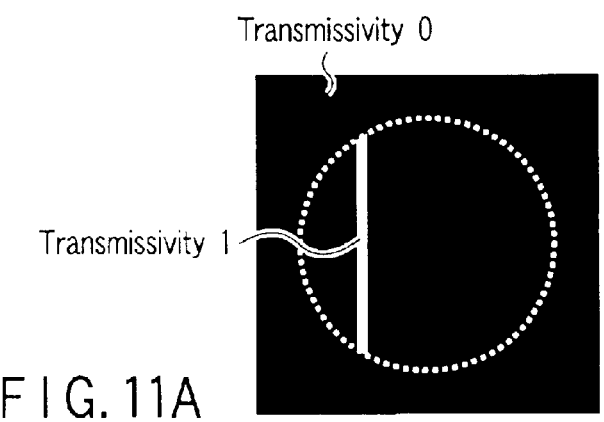
FIG. 11A is a view showing a slit pattern displayed in a liquid crystal spatial light modulating element 21 for illumination modulation in FIG. 10.

In this case, a slit pattern as shown in FIG. 11A is displayed in the liquid crystal spatial light modulating element 21 for illumination modulation (in the diagram, the white portion corresponds to the portion of transmissivity of 1, and the solid black portion corresponds to the portion of transmissivity of 0).

Figure 11B:
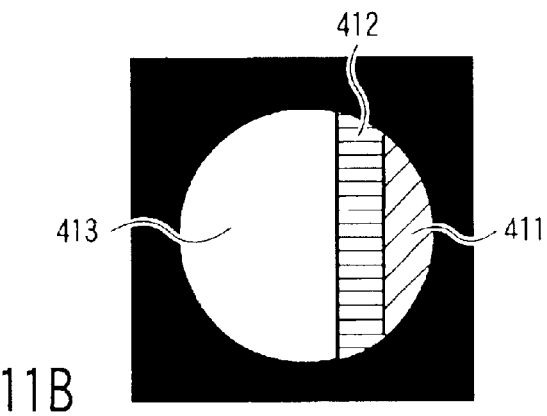
FIG. 11B is a view showing patterns different in transmissivity in every region of regions 411, 412, and 413 substantially parallel to the slit displayed in a liquid crystal spatial light modulating element 41 for pupil modulation in FIG. 10.

On the other hand, in the liquid crystal spatial light modulating element 41 for pupil modulation, patterns of different transmissivities are displayed in each region of regions 411, 412, and 413 substantially parallel to the slip as shown in FIG. 11B.

The standard set value is the transmissivity of 0in the region 411, transmissivity of 0.15 in the region 412, and transmissivity of 1.00 in the region 413.

By this modulation, the contrast is emphasized, and a directive and solid image can be observed.

By the same action of the components as in the first example, the acquired observed image data is sent to the image analysis device 8.

Figure 12:
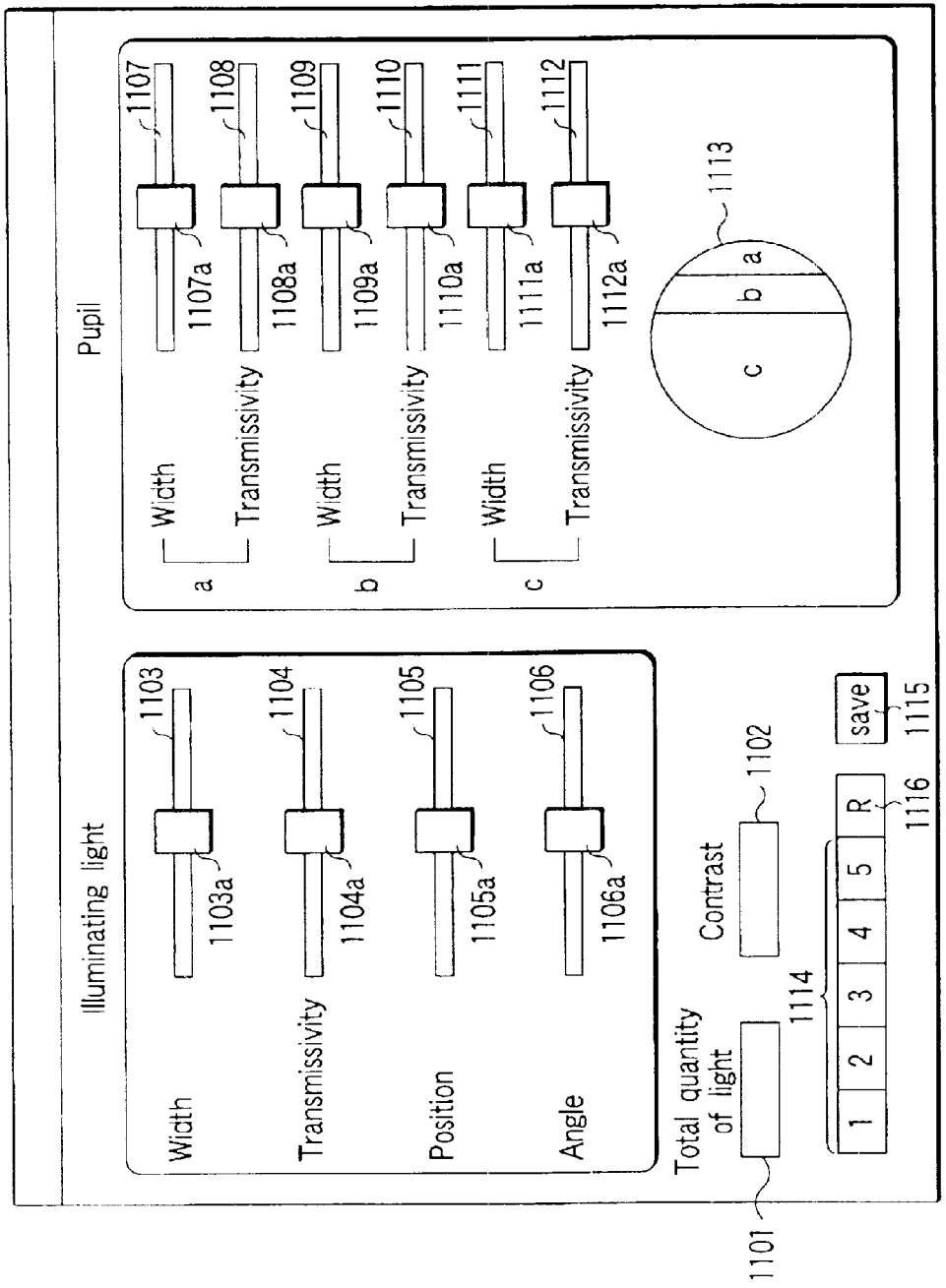
FIG. 12 is a view showing a graphical user interface (GUI) screen displayed on a CRT 71 as a display device in FIG. 10.

This image analysis device 8 is realized, same as in the first example, by the software in the computer 81. The device determines the contrast and total quantity of light relating to the image quality by using the image data, and the respective values are displayed in a bar 1101 and a button 1102 on the GUI screen as shown in FIG. 12.

On the other hand, the parameters of the liquid crystal spatial light modulating element 21 of the illumination modulating device 2 are the slit width of the pattern, the transmissivity of the slit, and the position and angle of the slit.

Parameters of the liquid crystal spatial light modulating element 41 of the pupil modulating device 4 are the region width of transmissivity of the pattern.

The parameter decision device 9 of the example is also realized by the software in the computer 81. While the observer is observing the quantity analyzed in the image analysis device 8 and displayed on the GUI screen and the observed image displayed on the CRT 71, these parameters are determined by the observer while manipulating the GUI screen.

The GUT screen of the parameter decision device 9 is shown in FIG. 12.

That is, of the parameters of the liquid crystal spatial light modulating element 21, the slit width of the pattern is determined by the manipulation of a bar 1103 on the GUT screen, the transmissivity of the slit is determined by the manipulation of a bar 1104, the slit position is determined by the manipulation of a bar 1105, and the slit angle is determined by the manipulation of a bar 1106.

Parameters of the liquid crystal spatial light modulating element 41 are respectively with and transmissivity in each region of each pattern in regions a (411 in FIG. 11B), b (412 in FIG. 11B), and c (412 in FIG. 11B), which are determined by manipulation of bars 1107 to 1112 on the GUI screen.

These operation units are composed of, same as in the first example, bars 1103 to 1112 on the GUI screen, and corresponding buttons 1103a to 1112a, and each value is determined by the relative position of the bars 1103 to 1112 and the buttons 1103a to 1112a.

The GUI screen of the example further comprises a portion 1113 for graphical display of the pattern to be displayed in the liquid crystal spatial light modulating element 41, a preset button 1114 and a save button 1115 for reading out or temporarily storing the already set parameter values, and a reset button 1116 for returning these parameters to initial values.

The values determined by the parameter decision device 9 are fed back to the controllers of the liquid crystal spatial light modulating element 21 and the liquid crystal spatial light modulating element 41. Therefore, same as in the first example, the observer can change the parameters while observing the observed image displayed on the CRT 71 by the parameters and the analyzed quantity displayed on the image analysis device 8 displayed on the GUI screen.

The observer can repeat the same manipulation until satisfied completely, so that an optimum observed image may be obtained.

In this example, the parameter is judged by a human operator for setting the parameters directly on the GUI screen, and although the ease of manipulation is somewhat sacrificed, optimum observation is possible because it is judged not only on the basis of the observed image, but also on the analyzed objective data.

In the foregoing examples of the embodiment, the contrast is shown as a scale relating to the fidelity, but noise level such as the Halo noise, spike noise, or specific noise pattern determined by the user may determined as other scale relating to the fidelity.

Second Embodiment

FIG. 13 is a block diagram showing a configuration of a versatile microscopic apparatus according to a second embodiment of the invention.

That is, the versatile microscopic apparatus in the second embodiment of the invention is, as shown in FIG. 13, characterized by disposing a pupil transmission optical system 10 between the objective lens 3 and the imaging lens 5 in the first embodiment, thereby forming newly an image plane P2 conjugate with the pupil P1 of the objective lens 3, in which the pupil provided inside of the lens barrel of the objective lens in most cases of the microscope is disposed on the outside so as to eliminate mechanical restrictions about installation of the pupil modulating device 4.

Other configuration and functional effect of the embodiment are same as in the first embodiment.

Incidentally, by inserting a plurality of pupil transmission optical systems 10, image planes conjugate with the pupil P1 of the objective lens can be newly formed by the same number.

FIRST EXAMPLE

Figure 14:
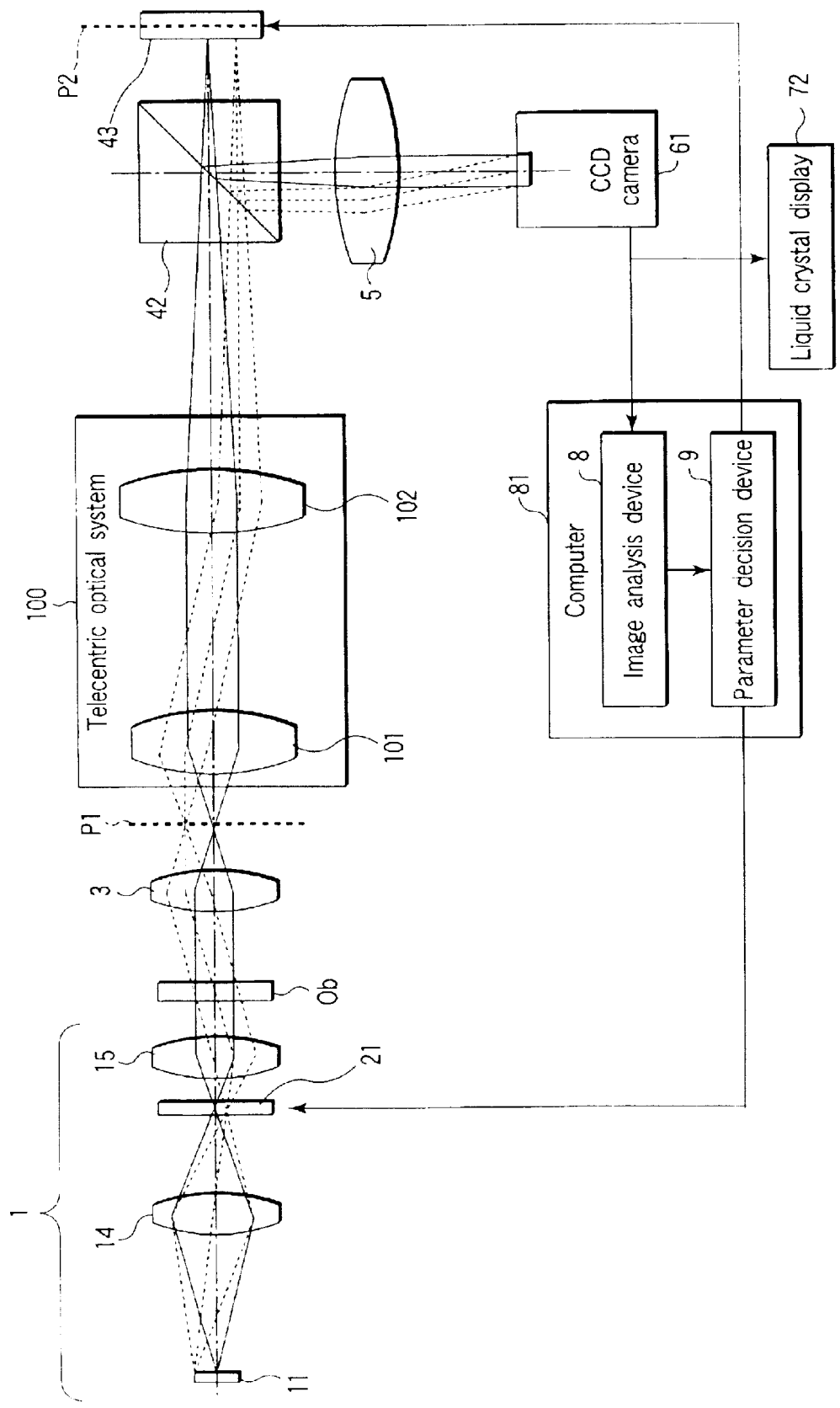
FIG. 14 is a block diagram showing a configuration of a versatile microscopic apparatus according to a first example of the second embodiment of the invention.

FIG. 14 is a block diagram showing a configuration of a versatile microscopic apparatus in a first example of the second embodiment of the invention.

The versatile microscopic apparatus in the example is, as shown in FIG. 14, similar to the second example of the first embodiment except for the following points: a telecentric optical system 100 composed of positive power lens systems 101 and 102 is disposed as the pupil transmission optical system 10 between the objective lens 3 and the imaging lens 5, and a plane P2 conjugate with the pupil plane P1 of the objective lens 3 is disposed between the pupil transmission optical system 10 and the imaging lens 5; and the liquid crystal spatial light modulating element 43 of reflection type and electric address type, capable of modulating both intensity and phase is disposed as the pupil modulating device 4 in the vicinity of the plane P2 instead of the pupil plane P1 of the objective lens.

According to this example, as shown in FIG. 14, the luminous flux generated by the halogen lamp of the light source 11 of the illuminating device 1 passes through the illuminating lens 14, the liquid crystal spatial light modulating element 21 of transmission type, electric address type, and intensity modulation type, and the illuminating lens 15, and enters the object Ob as illuminating light modulated in intensity. The luminous flux also reads out the information of the object Ob, and is put into the objective lens 3 to form a Fourier image on the pupil plane P1.

This Fourier image on P1 is put into the telecentric optical system 100.

In the telecentric optical system 100, the rear side focus plane of the lens system 101 and the front side focus plane of the lens 102 are substantially matched with each other, and the front side focus plane of the lens system 101 is disposed to coincide substantially with the pupil plane P1 of the objective lens 3. Thus, an image conjugate with the Fourier image of the objective lens 3 may be formed near the rear side focus plane of the lens system 102.

Near the position P2 on which the image conjugate with the pupil is formed, the liquid crystal spatial light modulating element 43 of reflection type capable of modulating both intensity and phase is disposed, and the luminous flux entering through the polarizing beam splitter 42 is modulated in both intensity and phase, and is reflected.

The modulated luminous flux is reflected by the polarizing beam splitter 42, and enters the imaging lens 5 disposed so that the front side focus plane thereof coincides substantially with the modulation plane of the liquid crystal spatial light modulating element 43. Then, an image is focused near the rear side focus plane of the imaging lens 5 on the imaging plane of the CCD camera 61.

In this example, too, a phase contrast microscope can be realized in the same manner as in the second example of the first embodiment.

Display of the result taken by the CCD camera 61 in the example, analysis of observed image in the image analysis device 8, and determination of parameters in the parameter decision device 9 are also same as in the second example of the first embodiment.

In this example, by the telecentric optical system 100, the pupil plane provided inside of the lens barrel of the objective lens in most case of the ordinary microscopes is disposed outside. Therefore, installation of the pupil modulating device 4 is free from mechanical restrictions, so that a highly versatile microscope may be realized more freely.

Other effects in the example are same as in the second example of the first embodiment.

SECOND EXAMPLE

FIG. 15 is a block diagram showing a configuration of a versatile microscopic apparatus in a second exampleof the second embodiment of the invention.

This example is, different from other examples, is a microscopic apparatus configured to observe the reflected light from the object as shown in FIG. 15.

In this example, as shown in FIG. 15, the photorefractive spatial light modulating element 44 of transmission type, phase modulation type, and photo address type is disposed near the pupil plane P1 of the objective lens 3 same as in the third example of the first embodiment, a pupil modulation data writing device 45 composed of a liquid crystal spatial light modulating element 45a of intensity modulation type, transmission type, and electric address type for writing modulation amount in the photorefractive spatial light modulating element 44 disposed near the pupil plane P1, a polarizing beam splitter 45b, an imaging lens 45c, and a writing light source 45e for generating a substantially collimating writing luminous flux 45d is disposed also same as in the third example of the first embodiment. Further, the versatile microscopic apparatus in the example is similar to the third example of the first embodiment except for the following points: a nonpolarizing beam splitter 16 is disposed in the illuminating device; and a liquid crystal spatial light modulating element 46 of reflection type, electric address type, and intensity modulation type is disposed near the pupil plane 2 conjugated with the pupil plane P1 of the objective lens.

According to this example, as shown in FIG. 15, the luminous flux generated by the halogen lamp of the light source 11 of the illuminating device 1 passes, same as in the preceding example, through the illuminating lens 14, the liquid crystal spatial light modulating element 21 of transmission type, electric address type, and intensity modulation type, and the illuminating lens 15, and enters the object Ob as illuminating light modulated in intensity. At the time, by using the nonpolarizing beam splitter 16, the illuminating light is bent, and is entered the object Ob, and the luminous flux is reflected from the object with carrying the object information. The luminous flux is passed and is put into the objective lens 3.

When the luminous flux enters the objective lens 3, a Fourier image is formed on the pupil plane P1 of the objective lens 3, and it is modulated in phase by the photorefractive spatial light modulating element 44 of transmission type, light writing type, and phase modulation type disposed in the vicinity thereof.

The modulation amount of the phase in the photorefractive spatial light modulating element 44 is adjusted similarly by the pupil modulation data writing device 45 in the same manner as in the third example of the first embodiment.

Further, a plane P2 conjugate with the pupil plane P1 is formed by the telecentric optical system 100 same as in the preceding example.

Near this plane P2, the liquid crystal spatial light modulating element 46 of electric address type and intensity modulation type is disposed.

The other configuration and function are same as in the preceding example.

In this example, the phase is modulated near the plane P1 and the intensity is modulated near the plane P2. Since the plane P1 and plane P2 are conjugate, the modulation is highly versatile same as in the preceding example, in which both phase and intensity are modulated near the plane P2.

In this example, in most cases of ordinary microscopes, it is designed to modulated by disposing the spatial light modulators both at the pupil plane provided inside of the lens barrel of the objective lens and the plane conjugate with the pupil plane newly disposed by the telecentric optical system 100. Therefore, a sufficient modulation is realized by collaboration of the two even if the spatial light modulator for modulating sufficiently cannot be disposed only at the pupil plane P1 inside of the lens barrel of the objective lens limited by space and mechanical restrictions.

Other effects of the example are same as in the preceding example.

THIRD EXAMPLE

Figure 16:
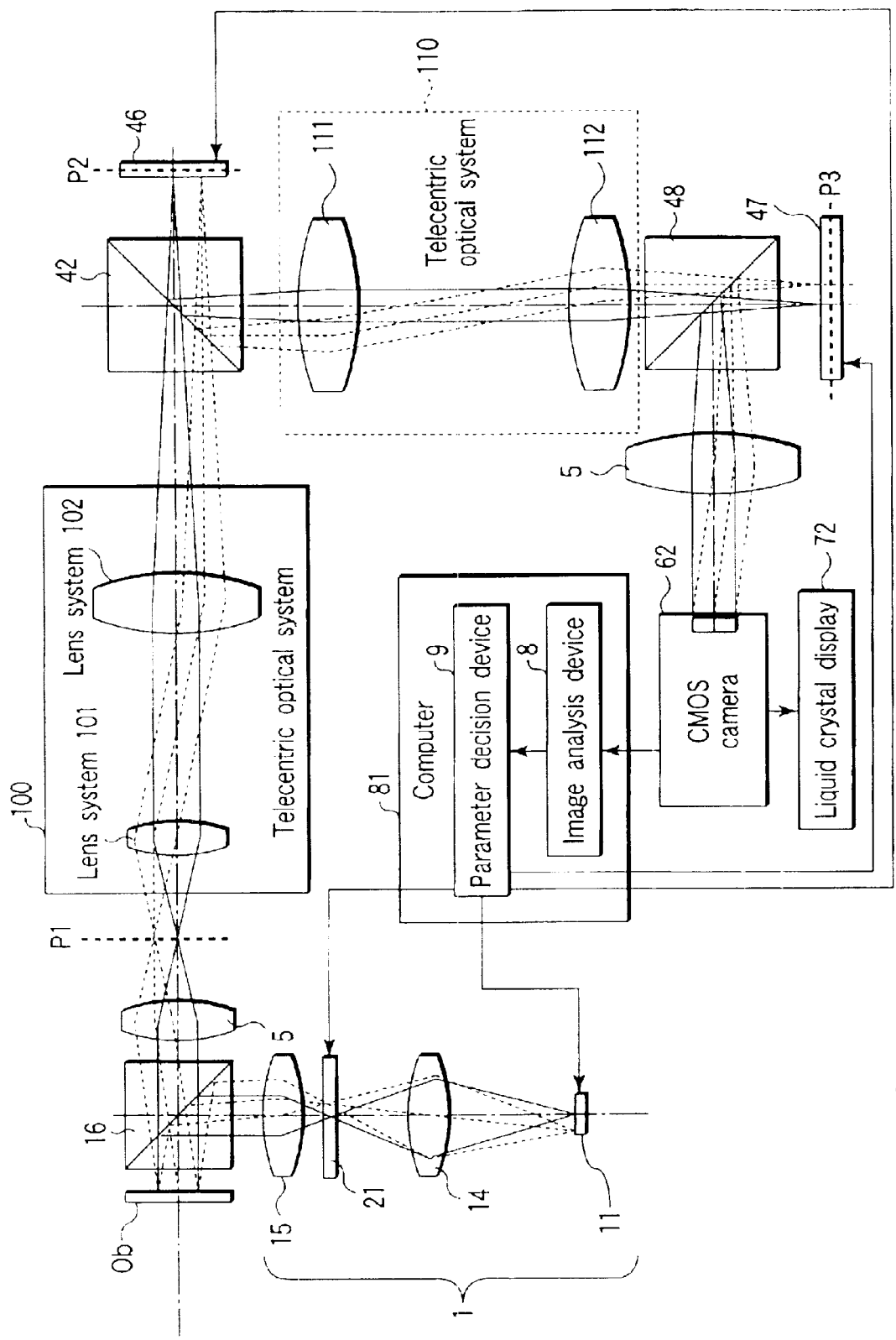
FIG. 16 is a block diagram showing a configuration of a versatile microscopic apparatus according to a third example of the second embodiment of the invention.

FIG. 16 is a block diagram showing a configuration of a versatile microscopic apparatus according to a third example of the second embodiment of the invention.

The versatile microscopic apparatus is, as shown in FIG. 16, same as in the preceding example except for the following points: instead of phase modulation by the photorefractive spatial light modulating element 44 at the pupil plane P1 in the preceding example, a new telecentric optical system 110 is added, and a plane P3 conjugate with P2 (that is, also conjugate with P1) is provided, and a liquid crystal spatial light modulating element 47 of reflection type, electric address type, and phase modulation type is disposed near this plane P3; a nonpolarizing beam splitter 48 is added accordingly; and the CCD camera is changed to a CMOS camera 62.

In this example, up to the liquid crystal spatial light modulating element 46, the configuration and function are same as in the second example of the second embodiment, except that modulation is not executed at the pupil plane P1 of the objective lens 3.

The luminous flux reflected and modulated in intensity by the liquid crystal spatial light modulating element 46 is reflected by the polarizing beam splitter 42, and is put into a second telecentric optical system 110.

The telecentric optical system 110 is also composed of two positive power lens systems 111, 112, and the rear side focus plane of the lens system 111 and the front side focus plane of the lens system 112 are nearly matched with each other, and the front side focus plane of the lens system 111 is further disposed so as to coincide substantially with the plane P2 conjugate with the pupil plane P1. Thus, an image conjugate with the plane P2 is formed on the rear side focus plane of the lens system 112.

Near the plane P3, the liquid crystal spatial light modulating element 47 of reflection type, electric address type, and phase modulation type is disposed.

In this liquid crystal spatial light modulating element 47, the luminous flux modified in intensity by the liquid crystal spatial light modulating element 46 is further modulated in phase and reflected.

The reflected luminous flux is further reflected by the nonpolarizing beam splitter 48, and passes through the imaging lens 5, and is taken as the observed image by the CMOS camera 62 disposed near the rear side focus plane.

Thereafter, the configuration and operation are same as in the preceding example.

In this example, since two planes conjugate with the pupil plane of the objective lens are formed by the two telecentric optical systems 100, 110, a highly versatile microscope can be realized more freely without having mechanical restrictions about installation of the pupil modulating device 4.

However, the optical system itself is slightly larger than in the other examples.

Other effects of the example are same as in the first example of the second embodiment.

Third Embodiment

FIG. 17A is a block diagram showing a configuration of a microscopic apparatus according to a third embodiment of the invention.

As shown in FIG. 17A, the microscopic apparatus in the third embodiment comprises: an illuminating device 1A including an illuminating light modulating device; an image magnifying optical system 2A composed of an objective lens and an imaging lens; an image transmission optical system 3A; a reflection type pupil modulating device 4A as pupil modulating device 4; an image pickup device 6 for picking up a modulated image; a display device 7 for displaying the image picked up by the image pickup device 6; an image analysis device 8 for determining the modulation amount of the pupil modulating device 4 so as to achieve an optimum image quality on the basis of the image data taken by the image pickup device 6, and feeding back this modulation amount; and a parameter decision device 9.

The illuminating device 1 is composed of a light source 10A, a collector lens 11A, a stop 12A, an opening 12B, and a condenser lens 13A.

The collector lens 11A is disposed so that its front side focus plane coincides substantially with the light source position, and the luminous flux generated in the light source 10A enters the collector lens 11A, and is focused on the stop 12A disposed near a rear side focus plane F0 of the collector lens 11A.

Near the plane of the stop 12A, the opening 12B is disposed as shown in FIG. 17B, and the luminous flux passing through the opening 12B passes through the condenser lens 13A disposed so that its front side focus plane coincides substantially with the opening 12B, and enters the object Ob.

This opening 12B is shaped like a ring, but its shape is not particularly specified.

The image magnifying optical system 2A is composed of an objective lens 20 and an imaging lens 21A, and forms a magnified image of the object Ob.

Reference numeral F1 is a pupil plane of the objective lens 20.

At this time, a rear side focus plane R1 of the condenser lens 13A and a front side focus plane of the objective lens 20 are disposed so as to coincide substantially with each other. Therefore, the front side focus plane F0 of the condenser lens 13A is in a conjugate relation with the pupil plane F1 of the objective lens 20.

Hence, an image nearly identical with the opening 12B is formed on the pupil plane F1 of the objective lens 20.

Further, since the pupil plane F1 of the objective lens 20 and the front side focus plane of the imaging lens 21A coincide substantially with each other, a magnified image of the object Ob is focused near a rear side focus plane R2 of the imaging lens 21A.

Herein, the object Ob is magnified, but an identical or reduced image may be formed depending on the combination of the objective lens 20 and imaging lens 21A.

The luminous flux of the magnified image enters the image transmission optical system 3A.

This image transmission optical system 3A is composed of a mirror 30 and a relay lens 31. As shown in FIG. 17A, a front side focus plane of the relay lens 31 is disposed so as to coincide substantially with the rear side focus plane R2 of the imaging lens 21A.

Therefore, a rear side focus plane F2 of the relay lens 31 is in a conjugate relation with the pupil plane of the objective lens, and the image of the pupil is formed.

The plane F2 to which this pupil is transmitted is disposed so as to coincide substantially with the reflection plane of the reflection type pupil modulating device 4A.

The luminous flux reflected by the reflection type pupil modulating device 4A enters the relay lens 31 again, and an image modulated by the pupil is formed near a rear side focus plane R3.

The reflection type pupil modulating device 4A is composed of a reflection type light writing type spatial light modulator (hereinafter called reflection type modulator) 40.

Figure 18:
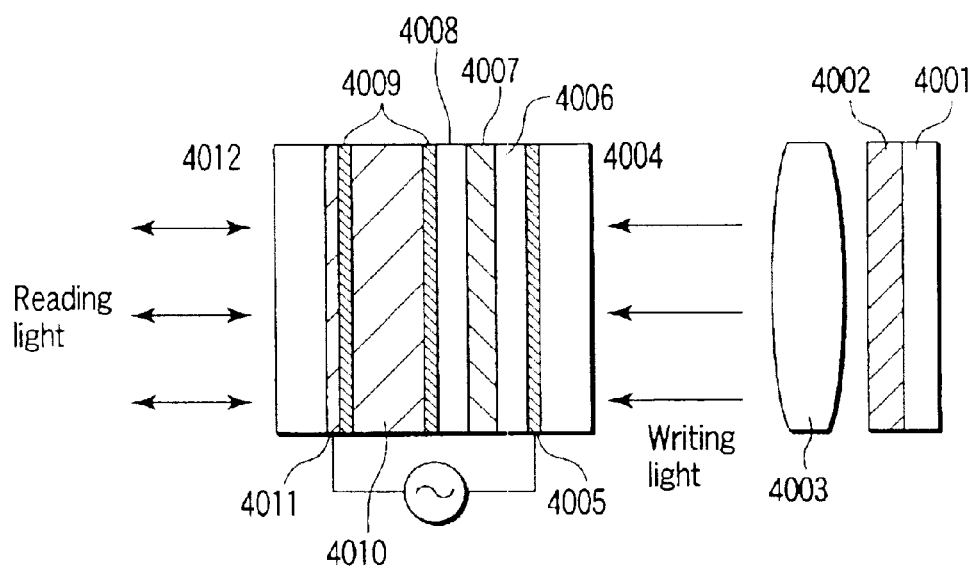
FIG. 18 is a diagram showing a configuration of a reflection type modulator 40 in FIG. 17A.

FIG. 18 is a diagram showing a configuration of the reflection type modulator 40.

This reflection type modulator 40 is composed of a writing light generating unit and a space light modulating unit as shown in FIG. 18.

The writing light generating unit is composed of a backlight 4001, a first liquid crystal 4002, and an optical system 4003. Image information from outside is displayed by the first liquid crystal 4002, and the information is read out by the light of the backlight 4001.

The luminous flux reading out the information of the first liquid crystal 4002 passes through the optical system 4003, and this information is written in a photoconductor layer 4006 of the space light modulating unit.

The space light modulating unit is composed of glass substrates 4004 and 4012, transparent electrodes 4005 and 4011, a photoconductor layer 4006, a light shielding layer 4007, a dielectric reflection film 4008, a liquid crystal orientation film 4009, and a liquid crystal 4010.

On the basis of the information written in the photoconductor layer 4006, amplitude and phase of the reading light are modulated (for detail of space light modulating unit, see "4.4 Space light modulating device", pp 170–173 of "Light information processing" by J. Tsujiuchi, Y. Ichioka, T. Minemoto, Ohm-Sha Publishing).

In the reflection type light modulator 40, the amplitude is modulated, and the incident luminous flux is modulated in amplitude at a specified position by a signal from controller and driver (not shown).

Figure 19:
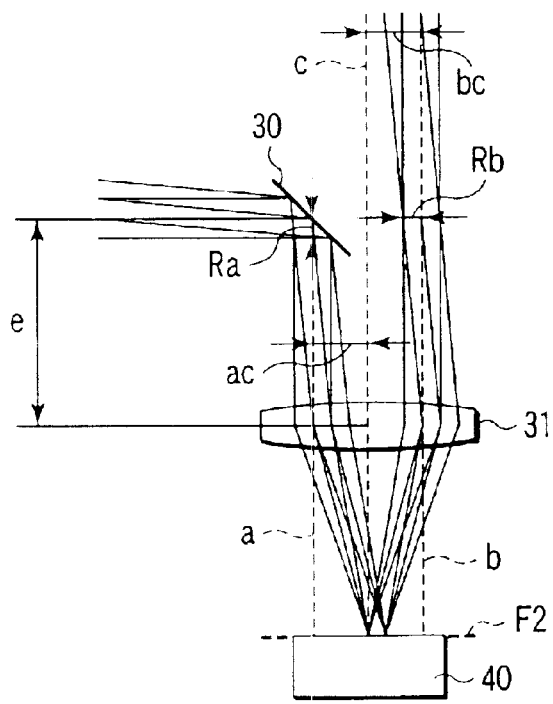
FIG. 19 is a diagram showing a function of a mirror 30 in FIG. 17A.

FIG. 19 is a diagram for explaining the function of the mirror 30.

Herein, as shown in FIG. 19, the optical axis of the luminous flux entering from the mirror 30 is not the central axis "c" of the relay lens 31, but the axis "a" remote from the central axis "c" by distance ac.

As for the luminous flux entering from the reflection type light modulator 40, too, the optical axis is not the central axis "c" of the relay lens 31, but the axis "b" remote from "c" to "a" at the opposite side by distance bc.

Supposing the distance between the mirror 30 and relay lens 31 to be "e", the radius of the luminous flux in the mirror 30 to be Ra, and the radius of the luminous flux at a position advanced by "e" from the relay lens 31 of the reflected light reflected by the reflection type light modulator 40 to be Rb, the following relation is established.

$$ac+bc>Ra+Rb \tag{1}$$

By satisfying this relation, the reflected light from the reflection type light modulator 40 does not return to the mirror 30, and deterioration of image due to return light or loss of quantity of light can be avoided.

Herein, the mirror 30 is disposed at the incident light side, but the same effects are obtained if disposed at the reflected light side.

The image pickup device 6 is composed of an image pickup element 50, and acquires a modulated image.

To avoid mechanical restrictions about installation or to magnify or reduce the image, a relay lens may be additionally provided as an image transmission optical system 3A at the front side of the image pickup element 50.

The observed image acquired by the image pickup device 6 is transmitted to the display device 7, so that the observer can directly observe the observed image.

At the same time, the observed image acquired by the image pickup device 6 is transmitted to the image analysis device 8, and the observed image is analyzed.

The analysis data obtained by this image analysis is sent to the parameter decision device 9.

The parameter decision device 9 determines the modulation amount of the reflection type pupil modulating device 4A so that the observed image may be shown in the optimum quality on the basis of the analysis data, and the determined modulation amount is fed back.

The reflection type pupil modulating device 4A changes the modulation amount on the basis of the modulation amount being fed back.

By repeating this process, optimum observation is realized in various methods of observations, in various objects differing in thickness, structure, absorption, the other physical properties, in a same configuration, without requiring replacement or adjustment of mechanical members.

In particular, by using the image analysis device 8 and the parameter decision device 9, very simple and optimum observation is possible regardless of the individual difference of people or presence or absence of experience.

Since the modulation by the reflection type pupil modulating device 4A is executed by continuous values, fine setting of modulation amount is possible as compared with the conventional microscope of fixed type or member exchange type, and a wider range of objects can be observed optimally.

In this configuration, the problem of the diffracted light can be avoided, and a microscope capable obtaining a favorable image, if modulated, can be realized.

FIRST EXAMPLE

Figure 20A:
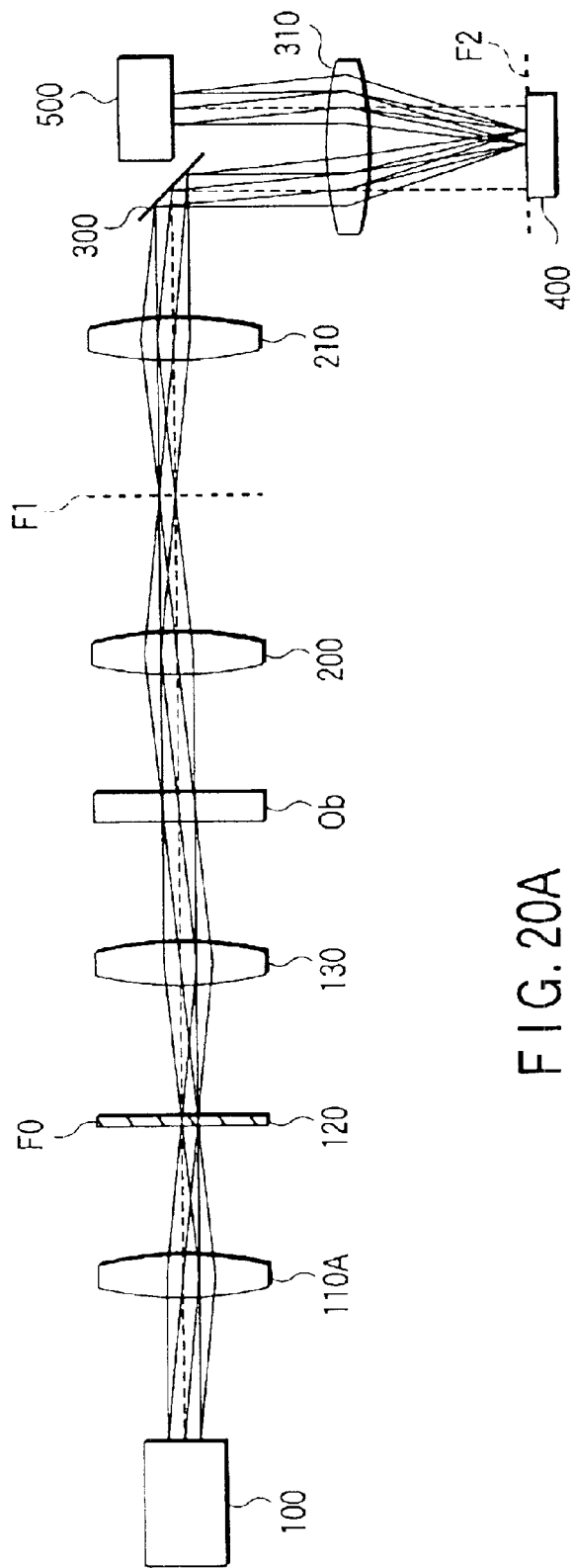
FIG. 20A is a block diagram showing a configuration of a microscopic apparatus according to a first example of the third embodiment of the invention.

FIG. 20A is a block diagram showing a configuration of a microscopic apparatus according to a first example of the third embodiment of the invention.

The microscopic apparatus of the first example comprises: an illuminating device 1 composed of a halogen lamp as a light source 100, a collector lens 110A, a stop 120, a ring-shaped opening 120R, and a condenser lens 130 of focal length of 30 mm; an image magnifying optical system 2A composed of an objective lens 200 of magnification of 40 times, NA of 0.85, and focal length of 5 mm, and an imaging lens 210 of focal length of 200 mm; an image transmission optical system 3A composed of a mirror 300 and a relay lens 310 of focal length of 200 mm; a liquid crystal spatial light modulating element 400 of reflection type, light writing type, and amplitude modulation type, having a display region diameter of 18 mm, as reflection type pupil modulating device 4A; a CCD camera 500 as image pickup device 6; and image analysis device 8 and parameter decision device 9 (not shown).

The luminous flux from the light source 100 passes through the collector lens 110A disposed so that the front side focus plane thereof coincides substantially with the light source position, and is focused on the stop 120 disposed in the vicinity of the rear side focus plane F0 of the collector lens 110A.

Figure 20B:
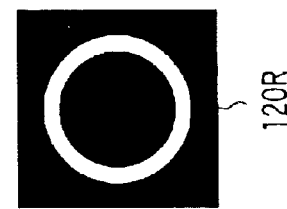
FIG. 20B is a view showing the shape of a ring-shaped opening 120R disposed in the vicinity of a stop 120 in FIG. 20A.

The ring-shaped opening 120R as shown in FIG. 20B is disposed near the plane of the stop 120, so that the luminous flux passing through the ring-shaped opening 120R passes through the condenser lens 130, and enters the object Ob.

The luminous flux passing through the object Ob is incident to the objective lens 200.

Reference numeral F1 is a pupil plane of the objective lens 200.

At this time, the rear side focus plane of the condenser lens 130 coincides substantially with the front side focus plane of the objective lens 200, so that the front side focus plane F0 of the condenser lens 130 is in a conjugate relation with the pupil plane F1 of the objective lens 200.

Hence, a pupil image of the substantially same shape as the opening 120R is formed on the pupil plane F1 of the objective lens 200.

Moreover, since the pupil plane F1 of the objective lens 200 and the front side focus plane of the imaging lens 210 are disposed to coincide with each other, a magnified image of the object Ob is focused near the rear side focus plane of the imaging lens 210.

The luminous flux is reflected by the mirror 300, and the luminous flux reflected by the mirror 300 passes through the relay lens 310, and a pupil image is focused on the rear side focus plane F2.

Near the rear side focus plane F2, the liquid crystal spatial light modulating element 400 is disposed as the reflection type modulating device 4.

The liquid crystal spatial light modulating element 400 modulates the incident luminous flux in amplitude at a specified position and reflects in a direction different from the incident direction, by means of a signal from the controller and driver (not shown).

The luminous flux thus modulated and reflected by the liquid crystal spatial light modulating element 400 passes through the relay lens 310 again by an optical axis distance in position from the optical axis at the time of entering the liquid crystal spatial light modulating element 400, and an image modulated in pupil is focused on the rear side focus plane.

The CCD camera 500 is disposed on the imaging plane, and the information is acquired by the CCD camera 500.

The information acquired by the CCD camera 500 is transmitted to the image analysis device 8, thereby analyzing the contrast, the total quantity of light, sharpness and the like.

On the basis of the result of analysis, the parameter decision device 9 determines parameters necessary for control of the liquid crystal spatial light modulating element 400, and the liquid crystal spatial light modulating element 400 is controlled according to the determined parameters.

As an example of modulation, an observation method similar to a dark field microscope is explained herein.

In this case, in the absence of the object Ob, the liquid crystal spatial light modulating element 400 forms a pattern similar to the pattern of the ring-shaped opening 120R shown in FIG. 21A. A ring pattern as shown in FIG. 21B is displayed so that the transmissivity is 0 in the luminous flux forming portion, and the transmissivity is 1 in the other portions.

By this modulation, the low frequency component of the object Ob is cut off, and only the high frequency component scattered by the object Ob is allowed to pass, so that the same process as in the ordinary dark field microscope may be realized.

In this embodiment, therefore, the parameters for controlling the liquid crystal spatial light modulating element 400 to be determined by the parameter decision device 9 are the inside diameter and outside diameter of the ring-shaped opening, and the transmissivity at the ring.

By feeding back these parameters by using the image analysis device 8 and the parameter decision device 9, optimum images may be always acquired in various objects.

SECOND EXAMPLE

Figure 22A:
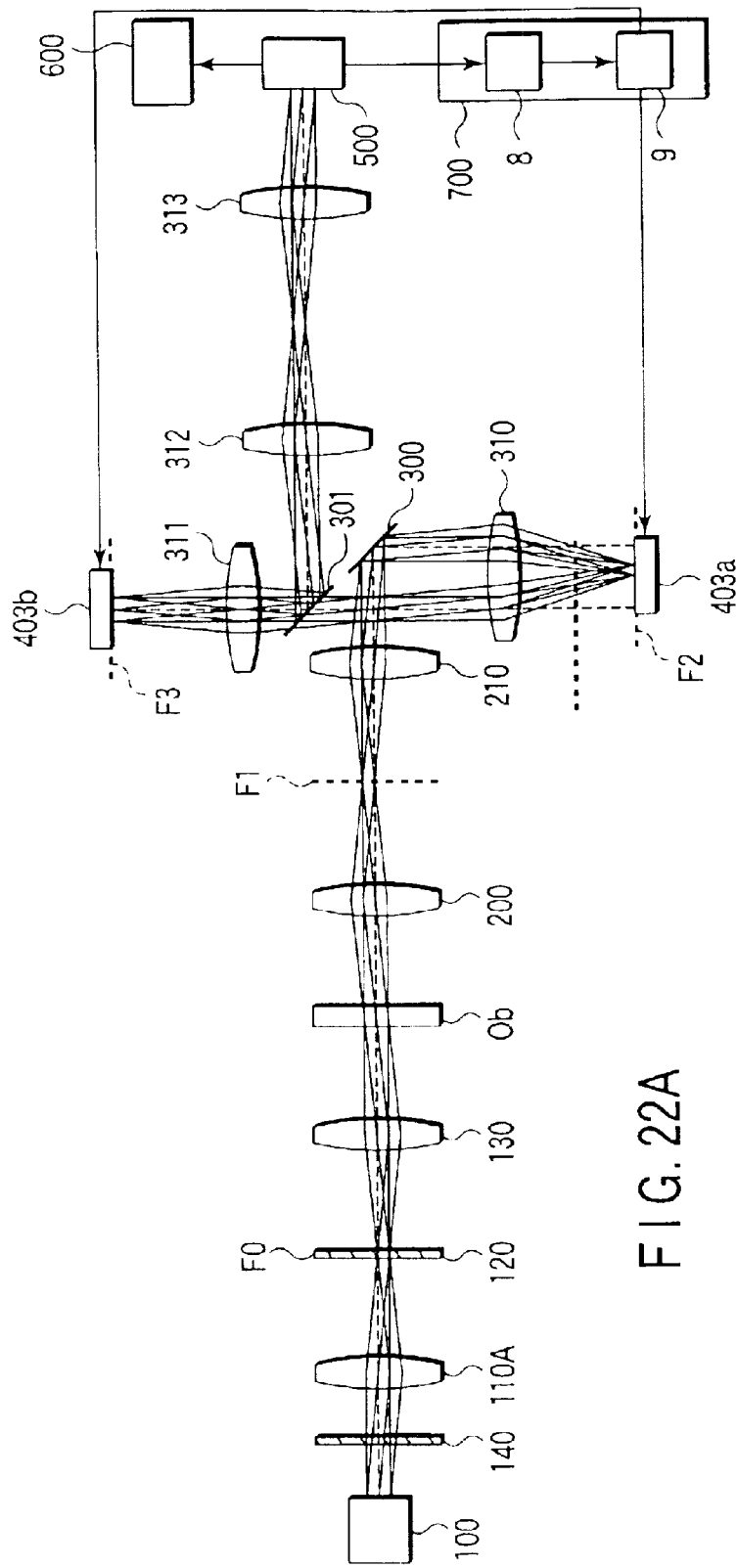
FIG. 22A is a block diagram showing a configuration of a microscopic apparatus according to a second example of the third embodiment of the invention.

FIG. 22A is a block diagram showing a configuration of a microscopic apparatus according to a second example of the third embodiment of the invention.

The microscopic apparatus in the second example is similar to the microscopic apparatus in the first example of the third embodiment except that Kehler illumination is used in the illuminating device 1, and a polarizer 140, a reflection type pupil modulating device 4A as pupil modulating device 4 newly disposed on a plane conjugate with the pupil plane of the objective lens, second relay lens 311, third relay lens 312, and fourth relay lens 313 as image transmission optical system 3A, and a CRT 600 as display device 7 are additionally disposed.

The microscopic apparatus of the second example comprises: an illuminating device 1 composed of LED array as light source 100, a collector lens 110A, a stop 120, a ring-shaped opening 120R, a condenser lens 130 of focal length of 40 mm, and a polarizer 140; an image magnifying optical system 2A composed of an objective lens 200 of magnification of 20 times, NA of 0.7, and focal length of 10 mm, and an imaging lens 210 of focal length of 200 mm; an image transmission optical system 3A composed of a mirror 300, a polarizing beam splitter 301, a relay lens 310 of focal length of 200 mm, a second relay lens 311 of focal length of 200 mm, a third relay lens 312 of focal length of 200 mm, and a fourth relay lens 313 of focal length of 100 mm; a first liquid crystal spatial light modulating element 403a of reflection type, light writing type, and phase modulation type, having a display region diameter of 16 mm, and a second liquid crystal spatial light modulating element 403b of reflection type, light writing type, and rotating in the direction of polarization at the time of reflection, having a display region diameter of 20 mm, as reflection type pupil modulating device 4A; a CCD camera 500 as image pickup device 6, and a computer 700 as image analysis device 8 and parameter decision device 9.

The direction of polarization is varied by the polarizer 140 so that the luminous flux from the light source 100 enters the polarizing beam splitter 301 by P polarization with respect to the reflection plane of the polarizing beam splitter 301, and it passes through the collector lens 110A disposed so that its front side focus plane coincides substantially with the light source position, and is focused on the stop 120.

Figure 22B:
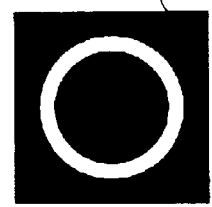
FIG. 22B is a view showing the shape of a ring-shaped opening 120R disposed in the vicinity of a stop 120 in FIG. 22A.

A ring-shaped opening 120R as shown in FIG. 22B is disposed in the vicinity of the plane of the stop 120, and the luminous flux passing through the ring-shaped opening 120R passes through the condenser lens 130, and enters the object Ob.

The luminous flux entering the object Ob reads out the information of the object Ob, and is put into the objective lens 200.

At this time, by disposing so that the rear side focus plane of the condenser lens 130 and the front side focus plane of the objective lens 200 coincide substantially with each other, the front side focus plane of the condenser lens 130 is in a conjugate relation with the pupil plane F1 of the objective lens 200, and the pupil plane F1 of the objective lens 200 is disposed so as to coincide with the front side focus plane of the imaging lens 210. Therefore, the luminous flux entering the objective lens 200 forms a pupil image of the object Ob on the pupil plane F1 of the objective lens 200, and the image is further focused by the imaging lens 210.

By disposing so that the rear side focus plane of the imaging lens 210 substantially coincides with the front side focus plane of the relay lens 310, the rear side focus plane F2 of the relay lens 310 is in a conjugate relation with the pupil plane F1 of the objective lens 200, and the luminous flux focused by the imaging lens 210 is reflected by the mirror 300, and a pupil image is formed near the pupil plane F2 of the relay lens 310.

Near the pupil plane F2 of the relay lens 310, the first liquid crystal spatial light modulating element 403a is disposed, and this first liquid crystal spatial light modulating element 403a modulates the pupil image of the object Ob in phase at desired position and reflects, by a signal from the controller and driver (not shown).

The luminous flux modulated and reflected by the first liquid crystal spatial light modulating element 403a enters again the relay lens 310 by using the optical axis remote in position from the optical axis when entering this first liquid crystal spatial light modulating element 403a, and an image is focused.

The luminous flux focused by the relay lens 310 passes through the polarizing beam splitter 301 because the direction of polarization is set in P polarization by means of the polarizer 140.

By disposing so that the rear side focus plane of the relay lens 310 at the opposite side of the first liquid crystal spatial light modulating element 403a and the front side focus plane of the second relay lens 311 coincide substantially with each other, the rear side focus plane F3 of the second relay lens 311 is in a conjugate relation with the pupil plane F1 of the objective lens 200, and the luminous flux passing through the polarizing beam splitter 301 forms a pupil image on the pupil plane F3 of the second relay lens 311.

Near the pupil plane F3, the second liquid crystal spatial light modulating element 403b is disposed. The second liquid crystal spatial light modulating element 403b modulates the pupil image of the object Ob in a direction of polarization at a desired position and reflects, by a signal from the controller and driver (not shown).

The luminous flux modulated by the second liquid crystal spatial light modulating element 403b enters the second relay lens 311 again, and is reflected by the polarizing beam splitter 301.

At this time, only the luminous flux in S polarization to the reflection plane of the polarizing beam splitter 301 is reflected, and the amplitude is modulated by modulating the direction of polarization by the second liquid crystal spatial light modulating element 403b.

Therefore, the luminous flux reflected by the polarizing beam splitter 301 is modulated in the amplitude, and is further transmitted by the third relay lens 312 and the fourth relay lens 313, and is focused on the imaging plane of the CCD camera 500, and the information is acquired by the CCD camera 500.

In the second example, for instance, a case of same process as in phase contrast microscope is explained.

In this case, in the absence of the object Ob, the first liquid crystal spatial light modulating element 403a forms a pattern similar to the pattern of the ring-shaped opening 120R shown in FIG. 23A. The first liquid crystal spatial light modulating element 403a modulates, as shown in FIG. 23C, the phase of the portion corresponding to the imaging portion (shaded area in the diagram). Further, the second liquid crystal spatial light modulating element 403b modulates, as shown in FIG. 23B, so that the transmissivity is slightly lower in the luminous flux focusing area (shaded area in the diagram) and the transmissivity is 1 in other area (white area in the diagram).

The image information acquired by the CCD camera 500 is sent to the CRT 600 as the display device 7, so that the observer can directly observe the observed image.

At the same time, the image information acquired by the CCD camera 500 is also sent to the image processing board with frame memory (not shown) in the computer 700, and is converted into digital data and transmitted to the image analysis device 8.

The image analysis device 8 is realized by the software and the image processing board in the computer 700, and analyzes the physical quantities relating to the image quality by using the image data.

In this example, the contrast, total quantity of light and rate of Halo are determined as the quantities relating to the fidelity.

On the other hand, the parameters common to the first liquid crystal spatial light modulating element 403a and the second liquid crystal spatial light modulating element 403b are the ring diameter and ring width of each pattern. Further the phase difference inside and outside of the ring is added to the first liquid crystal spatial light modulating element 403a.

Further the transmissities inside and outside of the ring is added to the second liquid crystal spatial light modulating element 403b.

The parameter values are analyzed by the parameter decision device 9 and image analysis device 8 realized by the software of the computer 700, and using the analyzed values (in this example, the contrast, total quantity of light, and rate of Halo) as variables, specified functions are set and determined. The determined parameter values are then fed back to the controller of the reflection type pupil modulating device 4A.

Specifically, in this example, the functions are set as follows.

$$x_{i+1}^j = x_i^j + \xi f_j'(u_i - u_0, v_i - v_0, w_i - w_0)$$

$$y_{i+1}^j = y_i^j + \zeta g_j'(u_i - u_0, v_i - v_0, w_i - w_0)$$

where $x_{i+1}^j$ and parameters for the first liquid crystal spatial light modulating element 403a, they are composed of pattern ring diameter (j=0), ring width (j=1), the phase on the ring (j=2) and the phase out of ring (j=3).

On the other side $y_{i+1}^j$ are parameters for the second liquid crystal spatial light modulating element 403b, they are composed of pattern ring diameter (j=0), ring width (j=1), the transmissivity in the ring (j=2) and the transmissivity out of the ring (j=3). The subscript i denotes the number of times of updating.

Further, $u_i$, $v_i$ and $w_i$ are the contrast, total quantity of light, and rate of Halo analyzed by the image analysis device 8.

Moreover, $u_0$, $v_0$ and $w_0$ are the standard value or user's set value, and subscript i denotes the number of times of updating same as above.

The standard value is a value preset as the average by preparing several types of standard samples, recording the images by an existing phase contrast microscope set optimally to the samples, inputting them into the image analysis device 8 of the computer 700, and analyzing the contrast, total brightness, and the rate of Halo.

This standard value can be set individually by the user.

Also, $f_j'$ and $g_j'$ are respectively functions of parameters j relating to change of contrast and total quantity of light, which are set separately for each multiplying factor of the objective lens.

Symbols $\xi$ and $\zeta$ are coefficients acting on the function, which are decreased depending on the number of times of updating.

At the time of initial start-up, these parameters are set at initial values.

By inputting the upper limit of the number of times of updating from the GUI (not shown), analysis of the processing results and determination of parameters are done automatically as mentioned above by the image analysis device 8 and the parameter decision device 9, so that the image quality is enhanced.

The GUI (not shown) comprises preset and save buttons for reading out or temporarily storing the parameter values, and a display unit for displaying the contrast, total quantity of light and the rate of Halo analyzed by the image analysis device 8.

This example realizes a microscopic apparatus capable observing optimum images easily and accurately in a wide range of various objects.

In this example, moreover, since both phase and amplitude can be modulated by the pupil, not limited to the phase contrast microscope, the example is basically very versatile and applicable to a wide range of observation methods.

THIRD EXAMPLE

FIG. 24A is a block diagram showing a configuration of a microscopic apparatus according to a third example of the third embodiment of the invention.

An optical system portion of the microscopic apparatus of the third example is different from that of the second example of the third embodiment in that the incident angle to the second liquid crystal light modulating device as the pupil modulating device 4 is not right angle.

The microscopic apparatus of the third example comprises: an illuminating device 1 composed of a metal halide lamp as a light source 100, a collector lens 110A, a stop 120, a slit-shaped opening 120S, and a condenser lens 130 of focal length of 20 mm; an image magnifying optical system 2A composed of an objective lens 200 of magnification of 60 times, NA of 0.9, and focal length of 3.3 mm, and an imaging lens 210 of focal length of 200 mm; an image transmission optical system 3A composed of a mirror 300, a relay lens 310 of focal length of 200 mm, a second relay lens 311 of focal length of 200 mm, a third relay lens 312 of focal length of 200 mm, and a fourth relay lens 313 of focal length of 50 mm; a reflection type pupil modulating device 4A composed of a first liquid crystal spatial light modulating element 402a of reflection type, light writing type, and phase modulation type, having a display region diameter of 10 mm, and a second liquid crystal spatial light modulating element 402b of reflection type, light writing type, and amplitude modulation type, having a display region diameter of 10 mm; a CCD camera 500 as image pickup device 6, and image analysis device 8 and parameter decision device 9 (not shown).

The luminous flux from the light source 100 enters the collector lens 110A, and then forms an image of the light source 100 at an equal scale on the collector lens 110A disposed near the stop 120.

A slit-shaped opening 120S as shown in FIG. 24B is disposed near the plane of the stop 120, and the luminous flux passing through the slit-shaped opening 120S enters the object Ob by way of the condenser lens 130.

The luminous flux entering the object Ob reads out the information of the object Ob to be incident to the objective lens 200.

At this time, by disposing so that the rear side focus plane of the condenser lens 130 substantially coincides with the front side focus plane of the objective lens 200, the front side focus plane of the condenser lens 130 is in a conjugate relation with the pupil plane F1 of the objective lens 200.

The pupil plane F1 of the objective lens 200 is disposed so as to coincide with the front side focus plane of the imaging lens 210. The luminous flux entering the objective lens 200 forms a pupil image of the object Ob on the pupil plane F1 of the objective lens 200, and the image is further focused by the imaging lens 210.

Since the rear side focus plane of the imaging lens 210 is disposed so as to coincide substantially with the front side focus plane of the relay lens 310, the rear side focus plane F2 of the relay lens 310 is in a conjugate relation with the pupil plane F1 of the objective lens 200. The luminous flux focused by the imaging lens 210 forms a pupil image near the rear side focus plane F2 of the relay lens 310.

Near the pupil plane F1 of the relay lens 310, the first liquid crystal spatial light modulating element 402a is disposed, and this first liquid crystal spatial light modulating element 402a modulates and reflects the pupil image of the object Ob in phase at a specified position by a signal from the controller and driver (not shown).

The luminous flux modulated and reflected by the first liquid crystal spatial light modulating element 402a enters again the relay lens 310 by using the optical axis remote in position from the optical axis when entering this first liquid crystal spatial light modulating element 402a, and an image is focused and reflected by the mirror 300.

Since the rear side focus plane of the relay lens 310 at the opposite side of the first liquid crystal spatial light modulating element 402a is disposed so as to coincide substantially with the front side focus plane of the second relay lens 311, the pupil plane F3 at the rear side focus plane of the second relay lens 311 is in a conjugate relation with the pupil plane F1 of the objective lens 200. The luminous flux reflected by the mirror 300 enters the second relay lens 311, and a pupil image is formed on the pupil plane F3 of the second relay lens 311.

Near the pupil plane F3 of the second relay lens 311, the second liquid crystal spatial light modulating element 402b is disposed, and the second liquid crystal spatial light modulating element 402b modulates and reflects the pupil image of the object Ob in amplitude at specified position by using a signal from the controller and driver (not shown).

The luminous flux modulated and reflected by the second liquid crystal spatial light modulating element 402b focuses an image again through the second relay lens 311, by using the optical axis remote in position from the optical axis when entering this second liquid crystal spatial light modulating element 402b.

The luminous flux focused by the second relay lens 311 is transmitted through the third relay lens 312 and the fourth relay lens 313. After that, an image is focused on the imaging surface of the CCD camera 500, and the information is acquired by the CCD camera 500.

The information acquired by the CCD camera 500 is transmitted to the image analysis device 8, and the contrast, total quantity of light, and sharpness are analyzed.

On the basis of the result of the analysis, the parameter decision device 9, determines parameters necessary for control of the liquid crystal spatial light modulating elements 402a and 402b, and the liquid crystal spatial light modulating elements 402a and 402b are controlled by the determined parameters.

In this example, an observation method similar to Hoffman modulation contrast observation using oblique illumination is explained.

Figure 25A:
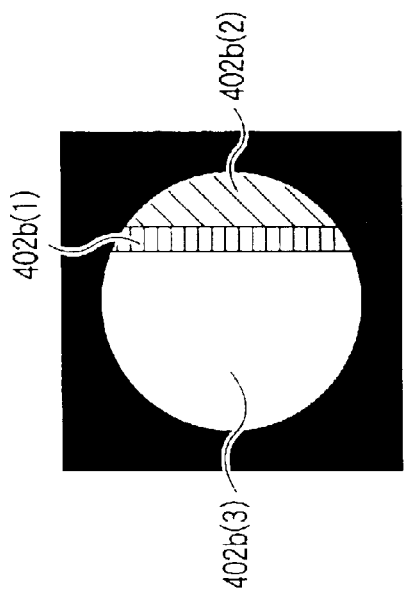
FIGS. 25A and 25B are views showing patterns displayed in a second liquid crystal spatial light modulating element 402b in FIG. 24A.

In this case, the slit-shaped opening 120S has a pattern as shown in FIG. 25A.

Herein, the white portion denotes the transmissivity of 1, and the black portion indicates the transmissivity of 0.

Figure 25B:
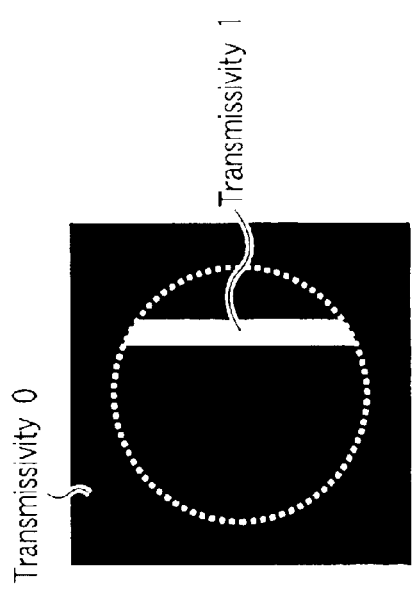
Figure 26:
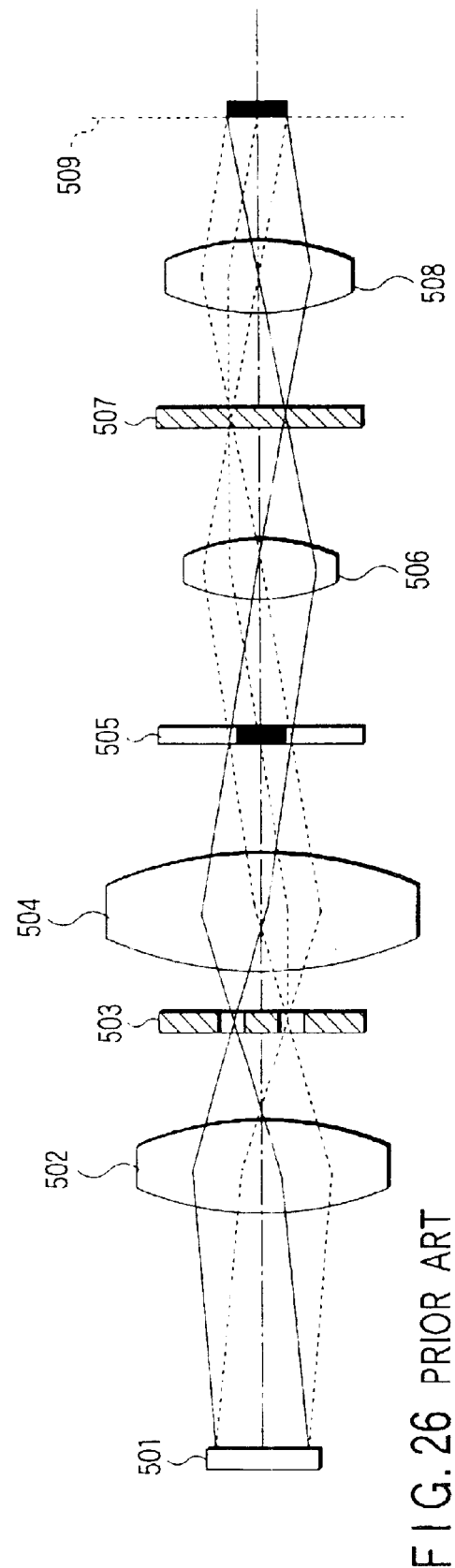
FIG. 26 is a diagram showing a schematic configuration of a conventional phase difference microscope.

In the second liquid crystal spatial light modulating element 402b, in the absence of the object Ob, a pattern similar to the pattern of the slit-shaped opening 120S is focused, and the second liquid crystal spatial light modulating element 402b shows patterns different in transmissivity in each one of the regions 402b(1), 402b(2), and 402b(3) parallel to this slit as shown in FIG. 25B.

Herein, the standard setting value is transmissivity of 0 in region 402b(1), transmissivity of 0.15 in region 402b(2), and transmissivity of 1 in region 402b(3).

On the other hand, the first liquid crystal spatial light modulating element 402a is divided into 500×500 pixels, and the aberration of the lens group is corrected by modulating the phase of individual pixels.

Therefore, the parameters necessary for modulation in the liquid crystal spatial light modulating elements 402a and 402b are the width and transmissivity of region 402b(1), region 402b(2), and region 402b(3) in the liquid crystal spatial light modulating element 402b, and the phase amount in each pixel in the liquid crystal spatial light modulating element 402a.

These parameters are determined in the parameter decision device 9 on the basis of the data of the image analysis device 8, and are fed back, so that optimum images may be obtained always in various objects.

By these modulations, the contrast is emphasized, and directive solid images can be observed.

In the foregoing embodiments and examples, the illuminating light modulating device 2 and the pupil modulating device 4 are realized by using the liquid crystal spatial light modulating element and photorefractive spatial light modulating element. However, but not limited to them, various spatial light modulating elements can be used without any restrictions, for example, organic spatial light modulating elements such as bacteriorhodopsin, spatial light modulating elements such as photochromics, semiconductor spatial light modulating elements such as multiple quantum wells, and mirrors changing in shape by electric signals.

As for modulation patterns, aside from those shown in the examples, all other patterns can be displayed, including codiametral patterns and combinations of concentric patterns and codiametral patterns.

In the illuminating devices, the effects can be obtained by installing heat ray removing filter, color filter, neutral density filter, and the like, but they are omitted because the effects are known for those skilled in the art.

The image analysis device 8 and the parameter decision device 9 are realized by the software in the computer, but they can be also realized by the electronic circuits or gate arrays, or higher speed in processing may be achieved by combining with image processing device, accelerator, etc.

Analysis of space frequency component used in judgement of resolution of the image analysis device 8 and the like may be determined also by using the results by picking up the intermediate luminous flux by the beam splitter, or results of analysis by light information processing may be used.

The modulation method on the pupil plane is not limited to the methods shown in the examples, but may be realized by various image processing methods such as the edge emphasis, space frequency filter, and morphology, aberration correction by lens system, other wave front control, and the like.

Of course, the correlation operation or the like can be applied.

In the foregoing explanation, the pupil plane and the plane conjugate to the pupil are disposed in a configuration substantially coinciding with the front side focus plane. However, same effects are obtained on the imaging plane of the imaging lens if the front side focus plane of the imaging lens does not coincide with the pupil plane or the plane conjugate with the pupil.

Therefore, as described herein, the invention provides a microscope as a microscopic apparatus having enough versatility capable of obtaining images of optimum image quality easily and accurately in a wide range of objects.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope comprising:
   an illuminating device which emits light from a light source to an object, and which generates a luminous flux including information of the object;
   an illuminating light modulating device which modulates at least one of wavelength, phase, intensity, polarization, and coherency of the light emitted to the object by the illuminating device;

an objective lens and an imaging lens which focus the luminous flux including the information of the object to form an image of the object;

a pupil modulating device which is disposed near a pupil plane of the objective lens, and which modulates at least one of phase, intensity and direction of polarization of the luminous flux including the information of the object;

an image pickup device which is disposed on a plane on which the image of the object is formed by the objective lens and the imaging lens, and which picks up the image of the object;

an image display device which displays the image of the object picked up by the image pickup device;

an image analysis device which analyzes the image of the object picked up by the image pickup device;

a parameter decision device which adjusts modulation amounts of the illuminating light modulating device and the pupil modulating device using the image information of the object analyzed by the image analysis device, wherein at least one pupil transmission optical system is disposed between the objective lens and the imaging lens, wherein a plane conjugate with the pupil plane of the objective lens is set between the objective lens and the imaging lens by the pupil transmission optical system, wherein said pupil modulating device is disposed near the conjugate plane, wherein said pupil transmission optical system comprises a telecentric optical system including a first lens group and a second lens group, and wherein a rear side focus plane of the first lens group and a front side focus plane of the second lens group substantially coincide with each other, and the front side focus plane of the first lens group substantially coincides with the pupil plane of the objective lens.

2. The microscope according to claim 1, wherein said pupil modulating device comprises a pupil modulating device of reflection type.

3. The microscope according to claim 2, wherein said pupil modulating device of reflection type is disposed so that a central ray of the luminous flux entering the pupil modulating device of reflection type intersects with a perpendicular of a reflection plane of the pupil modulating device of reflection type.

4. The microscope according to claim 3, further comprising a lens which passes both the luminous flux entering the pupil modulating device of reflection type and the luminous flux reflected by the pupil modulating device of reflection type, wherein said pupil modulating device and said lens are disposed so that each luminous flux passes through a different position of the lens.

5. The microscope according to claim 4, further comprising a reflection member which allows the luminous flux entering the pupil modulating device of reflection type and the luminous flux reflected by the pupil modulating device of reflection type to advance in a mutually different optical paths.

6. The microscope according to claim 5, wherein said reflection member is disposed so that reflected light of the reflection member enters the lens which passes both the luminous flux entering the pupil modulating device of reflection type and the luminous flux reflected by the pupil modulating device of reflection type.

7. The microscope according to claim 1, wherein said pupil modulating device comprises a spatial light modulator of photo address type including a writing light source, a spatial light modulating element, and an imaging lens, and wherein the microscope further comprises a pupil data writing device which writes into the spatial light modulator of photo address type based on the modulation amount adjusted by the parameter decision device.

8. The microscope according to claim 1, wherein said illuminating light modulating device modulates at least one of wavelength, intensity, direction of polarization, and coherency of the luminous flux from the light source based on the modulation amount adjusted by the parameter decision device.

9. The microscope according to claim 1, wherein said image analysis device analyzes at least one of a fidelity and resolution of the image, and analyzes a quality of the image.

10. The microscope according to claim 1, wherein said parameter decision device determines the modulation amounts of the illuminating light modulating device and the pupil modulating device using predetermined functions having at least on of a fidelity and resolution of the image analyzed by the image analysis device as a variable.

11. The microscope according to claim 1, wherein the image display device includes a graphical user interface to display an image analysis value analyzed by the image analysis device and input the modulation amounts of the illuminating light modulating device and the pupil modulating device.

12. A microscope comprising:

illuminating means for emitting light from a light source to an object, and generating a luminous flux including information of the object;

illuminating light modulating means for modulating at least one of wavelength, phase, intensity, polarization, and coherency of the light emitted to the object by the illuminating means;

an objective lens and an imaging lens which focus the luminous flux including the information of the object to form the image of the object;

pupil modulating means, disposed near a pupil plane of the objective lens, for modulating at least one of phase, intensity and direction of polarization of the luminous flux including the information of the object;

image pickup means, disposed on a plane on which the image of the object is formed by the objective lens and the imaging lens, for picking up the image of the object;

image display means for displaying the image of the object picked up by the image pickup means;

image analysis means for analyzing the image of the object picked up by the image pickup means; and parameter decision means for adjusting the modulation amounts of the illuminating light modulating means and the pupil modulating means using the image information of the object analyzed by the image analysis means, wherein at least one pupil transmission optical system is disposed between the objective lens and the imaging lens, wherein a plane conjugate with the pupil plane of the objective lens is set between the objective lens and the imaging lens by the pupil transmission optical system, wherein said pupil modulating means is disposed near the conjugate plane, wherein said pupil transmission optical system comprises a telecentric optical system including a first lens group and a second lens group, and wherein a rear side focus plane of the first lens group and a front side focus plane of the second lens group substantially coincide with each other, and the front side focus plane of the first lens group substantially coincides with the pupil plane of the objective lens.

13. The microscope according to claim 12, wherein said pupil modulating means comprises pupil modulating means of reflection type.

14. The microscope according to claim 13, wherein said pupil modulating means of reflection type is disposed so that a central ray of the luminous flux entering the pupil modulating means of reflection type intersects with a perpendicular of a reflection plane of the pupil modulating means of reflection type.

15. The microscope according to claim 14, further comprising a lens which passes both the luminous flux entering the pupil modulating means of reflection type and the luminous flux reflected by the pupil modulating means of reflection type, wherein said pupil modulating means and said lens are disposed so that each luminous flux passes through a different position of the lens.

16. The microscope according to claim 14, further comprising a reflection member which allows the luminous flux entering the pupil modulating means of reflection type and the luminous flux reflected by the pupil modulating means of reflection type to advance in mutually different optical paths.

17. The microscope according to claim 16, wherein said reflection member is disposed so that reflected light of the reflection member enters the lens which passes both the luminous flux entering the pupil modulating means of reflection type and the luminous flux reflected by the pupil modulating means of reflection type.

18. The microscope according to claim 12, wherein said pupil modulating means comprises a spatial light modulator of photo address type including a writing light source, a spatial light modulating element, and an imaging lens, and wherein the microscope further comprises pupil data writing means for writing into the spatial light modulator of photo address type based on the modulation amount adjusted by the parameter decision means.

19. The microscope according to claim 12, wherein said illuminating light modulating means modulates at least one of wavelength, intensity, direction of polarization, and coherency of the luminous flux from the light source based on the modulation amount adjusted by the parameter decision means.

20. The microscope according to claim 12, wherein said image analysis means analyzes at least one of a fidelity and resolution of the image, and analyzes a quality of the image.

21. The microscope according to claim 12, wherein said parameter decision means determines the modulation amounts of the illuminating light modulating means and the pupil modulating means using predetermined functions having at least one of a fidelity and resolution of the image analyzed by the image analysis means as a variable.

22. The microscope according to claim 12, wherein the image display means includes a graphical user interface to display an image analysis value analyzed by the image analysis means, and input the modulation amounts of the illuminating light modulating means and the pupil modulating means.

* * * * *